US011999076B2

(12) United States Patent
Mahoutian et al.

(10) Patent No.: US 11,999,076 B2
(45) Date of Patent: *Jun. 4, 2024

(54) SYSTEMS AND METHODS FOR CURING A PRECAST CONCRETE PRODUCT

(71) Applicant: CARBICRETE INC., Montreal (CA)

(72) Inventors: Mehrdad Mahoutian, Montréal (CA); Mario Venditti, Montréal (CA)

(73) Assignee: CARBICRETE INC, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,483

(22) Filed: Apr. 13, 2022

(65) Prior Publication Data

US 2022/0234247 A1 Jul. 28, 2022

Related U.S. Application Data

(63) Continuation of application No. 17/116,350, filed on Dec. 9, 2020, now Pat. No. 11,358,304.

(60) Provisional application No. 62/945,936, filed on Dec. 10, 2019.

(51) Int. Cl.
*B28B 11/24* (2006.01)
(52) U.S. Cl.
CPC .................................. *B28B 11/245* (2013.01)
(58) Field of Classification Search
CPC .................................................... B28B 11/245
See application file for complete search history.

(56) References Cited

U.S. PATENT DOCUMENTS

| 2,969,575 | A | * | 1/1961 | Gagne | B28B 1/087 |
| | | | | | 425/432 |
| 4,362,679 | A | | 12/1982 | Malinowski | |
| 4,588,443 | A | | 5/1986 | Bache | |
| 4,588,543 | A | | 5/1986 | Shimizu | |
| 4,746,481 | A | | 5/1988 | Schmidt | |
| 5,021,205 | A | | 6/1991 | Niioka | |
| 5,250,113 | A | | 10/1993 | Berke | |
| 5,366,549 | A | | 11/1994 | Imaizumi | |
| 8,845,594 | B2 | | 9/2014 | Jennings | |
| 10,112,871 | B2 | | 10/2018 | Shao | |
| 10,338,053 | B2 | | 7/2019 | Atakan | |

(Continued)

FOREIGN PATENT DOCUMENTS

| CA | 2942401 A1 | 9/2015 |
| CA | 3038515 A1 | 3/2018 |

(Continued)

OTHER PUBLICATIONS

Machine translation CN104420580A (Year: 2015).*

(Continued)

*Primary Examiner* — Jacob T Minskey
*Assistant Examiner* — Wayne K. Swier
(74) *Attorney, Agent, or Firm* — CANTOR COLBURN LLP

(57) ABSTRACT

A method of curing a concrete product having a cavity is described and includes positioning the concrete product on a base, sealing an opening to the cavity using a cover plate, introducing carbon dioxide ($CO_2$) gas into the cavity to execute carbonation of the concrete product, and, in response to the concrete product attaining a target specification, unsealing the opening. A system for curing a precast concrete product is also described.

20 Claims, 15 Drawing Sheets

(56) References Cited

U.S. PATENT DOCUMENTS

| | | | |
|---|---|---|---|
| 10,350,787 B2 | 7/2019 | Forgeron | |
| 10,570,064 B2 | 2/2020 | Monkman | |
| 2013/0343734 A1* | 12/2013 | Dock, II | F24H 9/20 |
| | | | 392/441 |
| 2014/0197563 A1* | 7/2014 | Niven | C04B 40/0231 |
| | | | 425/445 |
| 2014/0322083 A1* | 10/2014 | Kuppler | B28B 11/245 |
| | | | 422/109 |
| 2015/0141552 A1 | 5/2015 | Takizawa | |
| 2017/0036372 A1 | 2/2017 | Sandberg | |
| 2017/0073270 A1 | 3/2017 | Shao | |
| 2017/0102373 A1 | 4/2017 | Atakan | |
| 2017/0241871 A1 | 8/2017 | Mayelle | |
| 2018/0230057 A1 | 8/2018 | Guynn | |
| 2018/0258000 A1 | 9/2018 | Lee | |
| 2019/0047175 A1 | 2/2019 | Hargest | |
| 2019/0077045 A1 | 3/2019 | Monkman | |
| 2019/0168416 A1 | 6/2019 | Monkman | |
| 2019/0241473 A1 | 8/2019 | Goerger | |
| 2020/0181032 A1 | 6/2020 | Michud | |
| 2020/0299203 A1 | 9/2020 | Sant | |
| 2021/0107834 A1 | 4/2021 | Seth | |

FOREIGN PATENT DOCUMENTS

| | | | |
|---|---|---|---|
| CN | 101774790 A | | 7/2010 |
| CN | 101806118 A | | 8/2010 |
| CN | 102922598 A | | 2/2013 |
| CN | 202790521 U | | 3/2013 |
| CN | 104290182 A | | 1/2015 |
| CN | 104420580 A | * | 3/2015 |
| CN | 108789796 A | | 11/2018 |
| DE | 1646760 A1 | | 9/1971 |
| JP | 02137782 A | | 5/1990 |
| JP | 2000281467 A | | 10/2000 |
| JP | 2001253785 A | | 9/2001 |
| JP | 2005053078 A | | 3/2005 |
| WO | 2004074733 A1 | | 9/2004 |
| WO | 2017000075 A1 | | 1/2017 |
| WO | 2017041176 A1 | | 3/2017 |
| WO | 2017041188 A1 | | 3/2017 |
| WO | 2017075126 A1 | | 5/2017 |
| WO | 2017127454 A1 | | 7/2017 |
| WO | 2017152120 A1 | | 9/2017 |
| WO | 2017155899 A1 | | 9/2017 |
| WO | 2017177324 A1 | | 10/2017 |
| WO | 2017192938 A1 | | 11/2017 |
| WO | 2017210294 A1 | | 12/2017 |
| WO | 2018058139 A1 | | 3/2018 |
| WO | 2018175748 A1 | | 9/2018 |
| WO | 2018175769 A1 | | 9/2018 |
| WO | 2018232507 A1 | | 12/2018 |
| WO | 2019060992 A1 | | 4/2019 |
| WO | 2019101809 A1 | | 5/2019 |
| WO | 2019101810 A1 | | 5/2019 |
| WO | 2019101811 A1 | | 5/2019 |
| WO | 2019112555 A1 | | 6/2019 |
| WO | 2019165275 A1 | | 8/2019 |
| WO | 2019165281 A1 | | 8/2019 |
| WO | 2020046927 A1 | | 3/2020 |
| WO | 2020124054 A1 | | 6/2020 |
| WO | 2020217232 A1 | | 10/2020 |
| WO | 2021071980 A1 | | 4/2021 |
| WO | 2022118731 A1 | | 6/2022 |

OTHER PUBLICATIONS

Machine translation DE1646760A1 (Year: 1971).*
Machine translation JP2001243785A (Year: 2001).*
Machine translation CN101806118A (Year: 2010).*
Machine translation CN104290182A (Year: 2015).*

Shao Yixin, Morsher Abu (2013)—Early carbonation for hollow-core concrete slab curing and carbon dioxide recycling. Materials and Structures (2015) 48:307-319.
ACI Committee. (2008). 201.2R-08: Guide to Durable Concrete Durability. Michigan, US: American Concrete Institute.
Akers, S. A., & Studinka J., (1989). Ageing behaviour of cellulose fibre cement composites in natural weathering and accelerated tests. International Journal of Cement Composites and Lightweight Concrete, 11(2), 93-97. https://doi.org/10.1016/0262-5075(89)90119-X (year: 1989).
ASTM C418. Standard Test Method for Abrasion Resistance of Concrete by Sandblasting.
ASTM C494-99a (Standard Specification for Chemical Admixtures for Concrete, ASTM International, West Conshohocken, PA, 2019).
ASTM. (2018a). Standard Specification for Solid Concrete Interlocking Paving Units (vol. ASTM C936-20, ASTM C936-16). West Conshohocken, PA: ASTM International.
ASTM. (2018b). Standard Test Method for Evaluating the Freeze-Thaw Durability of Dry-Cast Segmental Retaining Wall Units and Related Concrete Units (vol. ASTM C1262-18). West Conshohocken, PA: ASTM International.
ASTM. (2018c). Standard Test Methods for Sampling and Testing Concrete Masonry Units and Related Units (vol. ASTM C140-20). West Conshohocken, PA: ASTM International.
ASTM. (2019a). Standard Test Method for Abrasion Resistance of Concrete or Mortar Surfaces by the Rotating-Cutter Method (vol. ASTM C944-99). West Conshohocken, PA: ASTM International.
ASTM. (2019b). Standard Test Method for Freeze-thaw and De-icing Salt Durability of Solid Concrete Interlocking Paving Units (vol. ASTM C1645-15). West Conshohocken, PA: ASTM International.
ASTM. Standard Specification for Dry-Cast Segmental Retaining Wall Units (vol. ASTMC1372-04 & ASTM C1372-11). West Conshohocken, PA: ASTM International.
CSA A231.2-14 Precast concrete pavers. 2014.
Environmental Protection Agency. (1995). AP 42—Compilation of Air Pollutant Emission Factors, 5th Edition, vol. 1; Appendix A, B1 and B2. Research Triangle Park, NC. U. S. Environmental Protection Agency.
Harsh Gupta et al., Strength Properties of Steel Slag in Concrete, Nov. 2017, International Journal of Engineering Research & Technology (IJERT), vol. 6, Issue 11 (Year: 2017).
International Search Report for corresponding application PCT/CA2020/050467 filed Apr. 9, 2020; Report dated Jun. 22, 2020.
International Search Report for corresponding application PCT/CA2021/050533 filed Apr. 20, 2021; Mail date Jul. 14, 2021.
International Search Report PCT/CA2020/050466 filed Apr. 9, 2020; Mail date Jun. 10, 2020.
Patel, H., Bland, C.H., and Poole, A.B. "The Microstructure of Concrete Cured at Elevated Temperatures". Cement and Concrete Research, 25(3). (1995). pp. 485-490.
Written Opinion of the International Searching Authority for corresponding application PCT/CA2020/050467 filed Apr. 9, 2020; Report dated Jun. 22, 2020.
Written Opinion of the International Searching Authority for corresponding application PCT/CA2021/050533 filed Apr. 20, 2021; Mail date Jul. 14, 2021.
Written Opinion of the International Searching Authority for PCT/CA2020/050466 filed Apr. 9, 2020; Mail date Jun. 10, 2020.
Zhang, D., Ghouleh, Z. and Shao, Y. , "Review on carbonation curing of cement-based materials". Journal of CO2 Utilization, 21, (2017). pp. 119-131.
International Search Report for corresponding application PCT/CA2020/051702 filed Dec. 10, 2020; Mail date Mar. 16, 2021.
Written Opinion for corresponding application PCT/CA2020/051702 filed Dec. 10, 2020; Mail date Mar. 16, 2021.
Chinese Office Action for corresponding application 202080094325.4; Report dated Jul. 14, 2023.
European Search Report for corresponding application EP20900084. Mail date Nov. 3, 2023.

\* cited by examiner

SYSTEMS AND METHODS FOR CURING A PRECAST CONCRETE PRODUCT

CROSS-REFERENCE

This application is a continuation of U.S. patent application Ser. No. 17/116,350 filed on Dec. 9, 2020, which claims priority on U.S. Patent Application No. 62/945,936 filed Dec. 10, 2019, the entire contents of which are incorporated herein by reference.

TECHNICAL FIELD

The application relates generally to precast concrete products, and more particularly to systems and methods for curing such precast concrete products.

BACKGROUND

Concrete products are ubiquitous in building structures in many parts of the world. Hence, improvements in systems and methods for curing precast concrete products are always desirable, and even small improvements in systems and methods for curing precast concrete products may provide extensive advantages to today's construction industries.

SUMMARY

Precast concrete products, e.g. pipes, manholes, culverts, are conventionally cured with heat and steam or with carbon dioxide where they are placed in sealed enclosed chambers, spaces, rooms or vessels. Calcium-rich materials, e.g. hydraulic cement, slag, non-hydraulic cement, containing calcium silicate phases react with carbon dioxide in the presence of water and are converted to strength-contributing phases including calcium carbonates.

The present description relates to a method of producing a precast concrete product where the fresh concrete is cured with carbon dioxide to gain its strength. The walls of the demoulded and optionally preconditioned concrete product acts as vessels to hold the pressure. In certain embodiments, neither an external pressurized vessel nor curing chamber are utilized to activate concrete. Instead, the internal or external space of hollow concrete products is used as a chamber and carbon dioxide unidirectionally penetrates the concrete walls. No external air tight enclosure is required. This innovation relates to production of precast concrete products, such as hollow precast concrete products, including but not limited to concrete pipes, culvert boxes, manholes, box girders and hollow core slabs.

In one aspect, there is accordingly provided a method of curing a concrete product having a cavity within the concrete product and an opening into the cavity, the method comprising: positioning the concrete product on a base, sealing the opening using a cover plate, introducing carbon dioxide (CO2) into the cavity to execute carbonation of the concrete product, and in response to the concrete product attaining a target strength (and/or other targeted specification(s)), unsealing the opening.

The method as described above and herein may further include, in whole or in part, and in any combination, one or more of the following additional features and/or steps.

In some embodiments, introducing the CO2 into the cavity includes pressurizing the cavity to a first pressure for a first period of time, followed by increasing the pressure in the cavity to a second pressure for a second period of time.

In some embodiments, introducing the CO2 is done through the cover plate and/or the concrete product.

In some embodiments, the opening is one of an open top end of the concrete product and an open bottom end of the concrete product, and the positioning includes placing the other one of the open top end and the open bottom end onto the base so as to seal the other one of the open top end and the open bottom end.

In some embodiments, the method comprises balancing the first and second pressures with the cover plate such that the cover plate continues sealing the opening during presence of the first and second pressures.

In some embodiments, the method comprises casting and demoulding the concrete product prior to positioning the concrete product, and wherein the steps of positioning the concrete product and introducing the CO2 are executed after and proximate in time to the step of demoulding.

In some embodiments, the steps of positioning the concrete product and introducing the CO2 are executed immediately after the step of demoulding.

In some embodiments, the method comprises executing at least one of setting, hydration, and pre-conditioning steps with respect to the concrete product prior to the step of introducing the CO2.

In some embodiments, the method comprises hydrating the concrete product after completion of the step of introducing the CO2.

In some embodiments, the method comprises pressurizing the cavity to a pre-determined pressure of the CO2.

In some embodiments, the method comprises varying the pre-determined pressure of the CO2.

In some embodiments, the pre-determined pressure is at least atmospheric pressure.

In some embodiments, the sealing the opening is such that at least some CO2 is allowed to escape from the cavity during the carbonation of the concrete product.

In some embodiments, the casting is executed using one or a combination of zero-slump concrete, wet concrete, and self-compacting concrete.

In some embodiments, fresh concrete is made using one or a combination of hydraulic cement, non-hydraulic cement, slag, pozzolanic materials, fly ash, silica fume and calcium hydroxide as binder.

In some embodiments, the casting is executed as one of dry casting and wet casting.

In some embodiments, the introducing the CO2 is executed by introducing a gas containing CO2 at a concentration of between 5% and 99.5% CO2 by mass.

In another aspect, there is provided a system for curing a precast concrete product having a cavity therein, the cavity having an open bottom end and an open top end, comprising: a base sized to receive the precast concrete product thereon and to cover the bottom end of the cavity, a cover plate sized to be received on top of the precast concrete product and to cover the top end of the cavity, a source of carbon dioxide gas (CO2), and a CO2 conduit fluidly connected to the source of CO2 and being configured to fluidly connect to the cavity.

The system as described above and herein may further include, in whole or in part, and in any combination, one or more of the following additional features and/or steps.

In some embodiments, the system comprises a height control system connected between the base and the cover plate and being operable to move the cover plate between a closed position in which the cover plate covers the top end of the cavity, and an open position.

In some embodiments, the system comprises a frame connected between the base and the cover plate, the cover plate being hinged to the frame to move between a closed position in which the cover plate covers the top end of the cavity, and an open position.

In some embodiments, the CO2 conduit fluidly connects to the cavity via one or more of the cover plate, a wall of the precast concrete product, and the base; and the source of CO2 is configured to pressurize the cavity to at least two different pressures that are at or above atmospheric pressure.

In some embodiments, a flow control valve is disposed in fluid flow communication with the source of CO2, the flow control valve configured to control a rate and/or a pressure of the CO2 gas supplied into the cavity.

In another aspect, there is provided a method of curing a concrete product having a cavity therein, the method comprising: sealing the cavity; executing carbonation of the concrete product by introducing carbon dioxide (CO2) gas into the cavity, and in response to the concrete product attaining a target specification (such as strength and/or other targeted specification(s)), unsealing the cavity.

The method as described above and herein may further include, in whole or in part, and in any combination, one or more of the following additional features and/or steps.

In some embodiments, the method includes disposing at least one container into the cavity prior to sealing the cavity, the at least one container containing the CO2 gas pressurized therein, and wherein introducing the CO2 gas into the cavity includes releasing the CO2 gas into the cavity from the at least one container.

In some embodiments, introducing the CO2 into the cavity includes pressurizing the cavity to a first pressure for a first period of time, followed by increasing the pressure in the cavity to a second pressure for a second period of time.

In some embodiments, the at least one container includes at least one of a tire tube and a tire.

In some embodiments, introducing the CO2 into the cavity includes operating at least one valve fluidly connected to the at least one of the tire tube and the tire.

In some embodiments, sealing the cavity is executed using a cover plate and further comprising balancing the first and second pressures with the cover plate such that the cover plate continues sealing the opening during presence of the first and second pressures.

In some embodiments, the method includes casting and demoulding the concrete product prior to the sealing the cavity, and wherein the step of introducing the CO2 is executed after and proximate in time to the step of demoulding.

In some embodiments, the step of introducing the CO2 is executed immediately after the step of demoulding.

In some embodiments, the method includes executing at least one of setting, hydration, and pre-conditioning steps with respect to the concrete product prior to the step of introducing the CO2.

In some embodiments, the method includes hydrating the concrete product after completion of the step of introducing the CO2.

In some embodiments, the method includes pressurizing the cavity to a pre-determined pressure of the CO2.

In some embodiments, the method includes varying the pre-determined pressure of the CO2.

In some embodiments, the pre-determined pressure is at least atmospheric pressure.

In some embodiments, the method includes sizing the at least one container to occupy between 10% and 98% of a volume of the cavity.

In some embodiments, at least one of the tire tube and the tire is used.

In some embodiments, the casting is executed as one of dry casting and wet casting.

In some embodiments, introducing the CO2 is executed by introducing a gas containing CO2 at a concentration of between 5% and 99.5% CO2 by mass.

In another aspect, there is provided a method of curing a concrete product, the method comprising: enclosing an outer surface of the concrete product in a sleeve having a shape conforming at least in part to the outer surface of the concrete product, such that the sleeve is disposed proximate but spaced apart from the outer surface to define a space between the outer surface and the sleeve; sealing the space between the outer surface and the sleeve; introducing carbon dioxide (CO2) gas into the space between the outer surface and the sleeve to execute carbonation of the concrete product, wherein at least some of the CO2 gas passes through the outer surface of the product in an inward direction; and in response to the concrete product attaining a target specification (such as strength and/or other targeted specification(s)), unsealing the space between the outer surface and the sleeve.

The method as described above and herein may further include, in whole or in part, and in any combination, one or more of the following additional features and/or steps.

In some embodiments, the concrete product includes a cavity therein and an opening into the cavity, and enclosing the outer surface of the concrete product excludes sealing the opening.

In some embodiments, enclosing the outer surface of the concrete product leaves the opening open.

In some embodiments, introducing the CO2 gas into the space is executed through the sleeve.

In some embodiments, sealing the space between the outer surface of the concrete product and the sleeve includes disposing a cover plate over the concrete product, the cover plate being operatively connected to the sleeve at least during the step of introducing the CO2 gas by being one or more of: weighted to balance a pressure of the CO2; hinged to the sleeve; and guided relative to the sleeve.

In some embodiments, the cover plate includes an opening therein, the opening aligning at least in part with the opening into the cavity of the concrete product when the cover plate is disposed over the concrete product.

In another aspect, there is provided a system for curing a precast concrete product having a cavity therein, the cavity having an open bottom end and an open top end, comprising: a base sized to receive the precast concrete product thereon and to thereby cover the bottom end of the cavity, a sleeve sized to encompass the concrete product therein, the sleeve having a bottom end that is disposed on and sealed with respect to the base, a cover plate sized to be received on top of the precast concrete product and to thereby cover the top end of the cavity, the cover plate being operatively connected to the sleeve to seal a space between the sleeve and an outer surface of the concrete product when the cover plate and to thereby seal the space, and a source of carbon dioxide gas (CO2) configured to be fluidly connected to the space.

The system as described above and herein may further include, in whole or in part, and in any combination, one or more of the following additional features and/or steps.

In some embodiments, the source of CO2 fluidly connects to the space via at least one of the sleeve and the cover plate.

In some embodiments, the cover plate is hinged to the sleeve to be pivotable between an open position in which the concrete product is movable into and out of the sleeve and a closed position in which the cover plate seals the space between the concrete product and the sleeve.

In some embodiments, the source of CO2 is configured to pressurize the cavity to at least two different pressures that are at or above atmospheric pressure.

BRIEF DESCRIPTION OF THE DRAWINGS

Reference is now made to the accompanying figures in which.

DETAILED DESCRIPTION

Precast concrete products, e.g. pipes, manholes, culverts, are conventionally cured with heat and steam. Precast concrete products can also be cured with carbon dioxide, where they are placed in sealed enclosed chambers, spaces, rooms or vessels. Calcium-rich materials, e.g. hydraulic cement, slag, non-hydraulic cement, containing calcium silicate phases react with carbon dioxide in the presence of water and are converted to strength-contributing phases including calcium carbonates.

The present description relates to systems and methods of producing a precast concrete product (P) where the fresh concrete is cured with carbon dioxide ($CO_2$) to gain its strength. In some embodiments, the walls of the demoulded and in some embodiments preconditioned concrete product (P) act to contain and hold the $CO_2$ pressure, and thereby help reduce curing times and cost. With the present technology, at least some aspects of the production of hollow concrete products (P), such as precast concrete products including concrete pipes, culvert boxes, manholes, box girders and hollow core slabs may be improved.

With the above in mind, the present description first describes non-limiting embodiments of a system for curing a precast concrete product (P), then describes non-limiting examples of various possible materials and casting methods that may be associated with the system, and then describes non-limiting examples of various possible methods of curing concrete which may for example be executed using one or more of the illustrated embodiments of the system.

System 100

Figure 1:
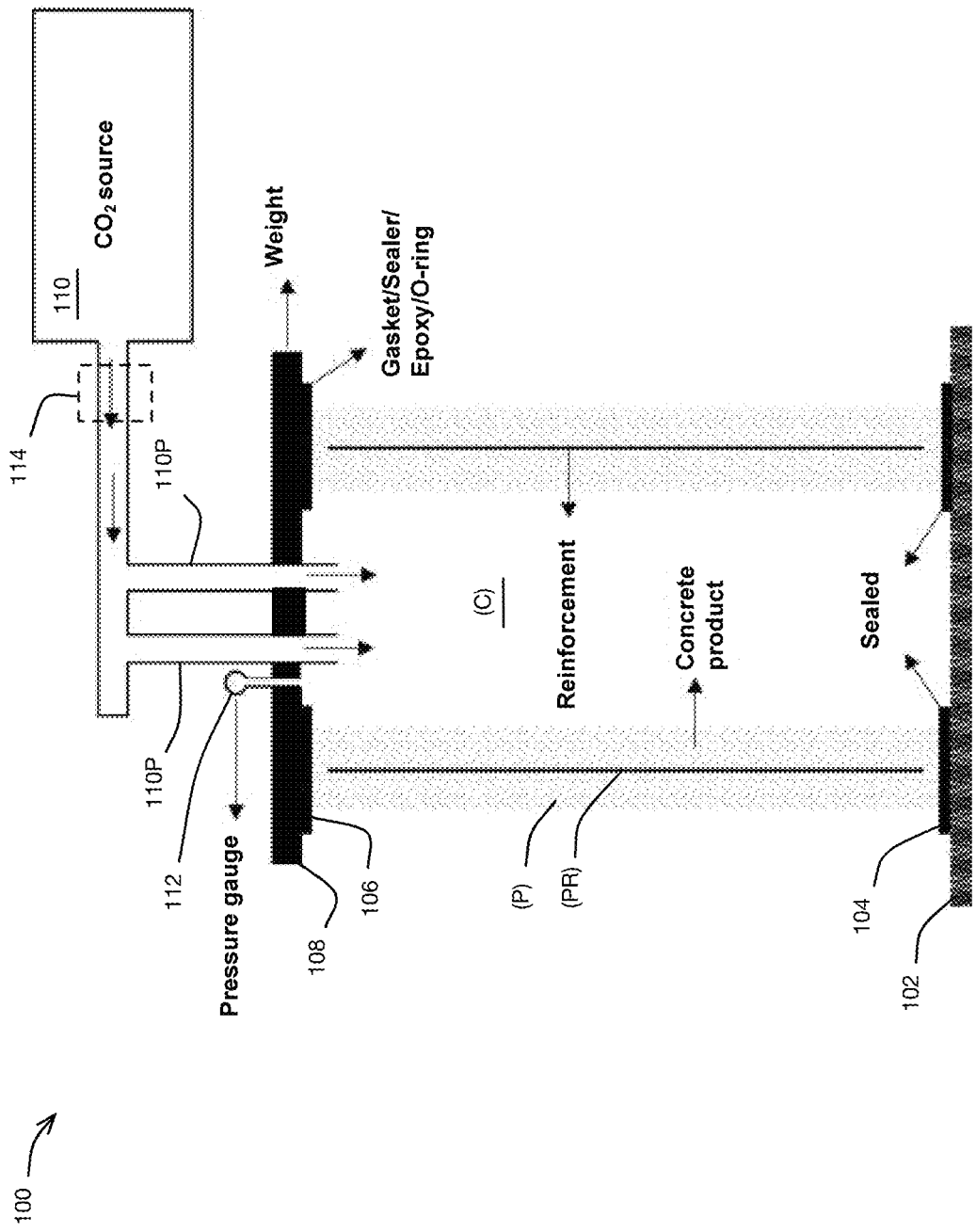
FIG. 1 is a schematic of a system for curing a concrete product.

Referring to FIG. 1, there is shown a system 100 for curing a precast concrete product (P). The system 100 includes a base 102, such as a floor for example, a lower seal 104 disposed on the base 102, and an upper seal 106 engaged with a cover plate 108. The seals 104, 106 may be rubber gaskets, sealers, epoxy, O-rings or any other suitable seals. The seals 104, 106 may encompass the concrete product (P) like a sleeve, such as shown with numeral 306' in FIG. 5 for example. Such sleeve-like concrete product (P) may cover up to about 20% of a height of the concrete product (P) in some embodiments. Although such configurations may provide sealing advantages, other height percentages are also contemplated. In some embodiments, the lower seal 104 and/or the upper seal 106 may be omitted.

In this embodiment, the seals 104, 106 and the cover plate 108 are annular to match and seal corresponding part(s) of the concrete product (P), although other shapes and seals may be used such as for example when the concrete product (P) is of a different shape. In some embodiments the cover plate 108 is dimensioned and/or its material is selected so as to provide a weight of the cover plate that balances the gas pressures that may be present within the concrete product (P) as described in this document. As will be described and shown below in more detail, in its various embodiments and applications/systems, the cover plate 108 may be weighted (e.g. to hold the concrete product (P) sealed as described without requiring any additional mechanical forces to be applied to the cover plate 108), and/or may be hinged and/or may be guided on one or more rods/supports, and/or may be translatable automatically (e.g. via a suitable conventional powered actuation mechanism). The base 102, the seals 104, 106 and the cover plate 108 are sized to cover a cavity (C) in an precast concrete product (P) of at least one size. In some embodiments, the seals 104, 106 and the cover plate 108 are made sufficiently large to be able to enclose and cure, as described in detail below, any one of a number of different sizes of precast concrete products (P) and/or cavities (C).

The system 100 further includes a carbon dioxide ($CO_2$) source 110 operable to supply $CO_2$ into the cavity (C) in the precast concrete product (P), and a pressure gauge 112 mounted through the cover plate 108 for monitoring gas pressure in the cavity (C). As shown, in some embodiments, one or more suitable $CO_2$ conduits 110P, such as pipes or ducts for example, fluidly connect to the carbon dioxide ($CO_2$) source 110 to receive $CO_2$ therefrom. The $CO_2$ conduits 110P pass through the cover plate 108, for supplying the $CO_2$ into the cavity (C) in the precast concrete product (P) for curing the precast concrete product (P). In other embodiments, the concrete product (P) may have a different shape.

In some embodiments, the interface(s) between the $CO_2$ conduits 110P and the cover plate 108 may be sealed so as to be at least substantially impermeable to gas. In some embodiments, to facilitate movement of the cover plate 108 on an off each given concrete product (P), the $CO_2$ conduit(s) 110P may in part or in whole be made flexible. In other embodiments, the $CO_2$ conduits 110P may be rigid and/or removable from the cover plate 108, such as via clip-on connectors, to provide for the movement of the cover plate 108 on an off each given concrete product (P).

The carbon dioxide (CO2) source 110 may be any suitable carbon dioxide (CO2) source, such as a conventional carbon dioxide (CO2) source, and is therefore not described herein in detail. In some embodiments, the carbon dioxide (CO2) source 110 is configured to control the rate and pressure of the CO2 supplied into the cavity (C) in the precast concrete product (P). To this end, and as shown in FIG. 1, the carbon dioxide (CO2) source 110 and/or one or more of the CO2 conduits 110P may include manual and/or actively controlled flow control valves 114. The flow control valves 114, and their associated controls, may be conventional and are therefore not described herein in detail.

The cover plate 108 in this embodiment is made from a suitable metal, and is dimensioned to have a weight sufficient to maintain the cavity (C) in the precast concrete product (P) at least substantially sealed during the curing process. It will be understood that the cover plate 108 may be made to have different weights, depending on the pressure(s) to which the carbon dioxide (CO2) source 110 may be configured to pressurize the cavity (C) in the precast concrete product (P) with CO2. That is, the weight of the cover plate 108 may be selected to sufficiently compress the seals 104, 108 to maintain the cavity (C) in the precast concrete product (P) at least substantially sealed during the curing process. In other embodiments, the seals 104, 108 and the cover plate 108 may have a different shape, depending on the shape of the cavity (C) and the shape of the precast concrete product (P) to be sealed and cured.

System 200

Figures 2A, 2B:
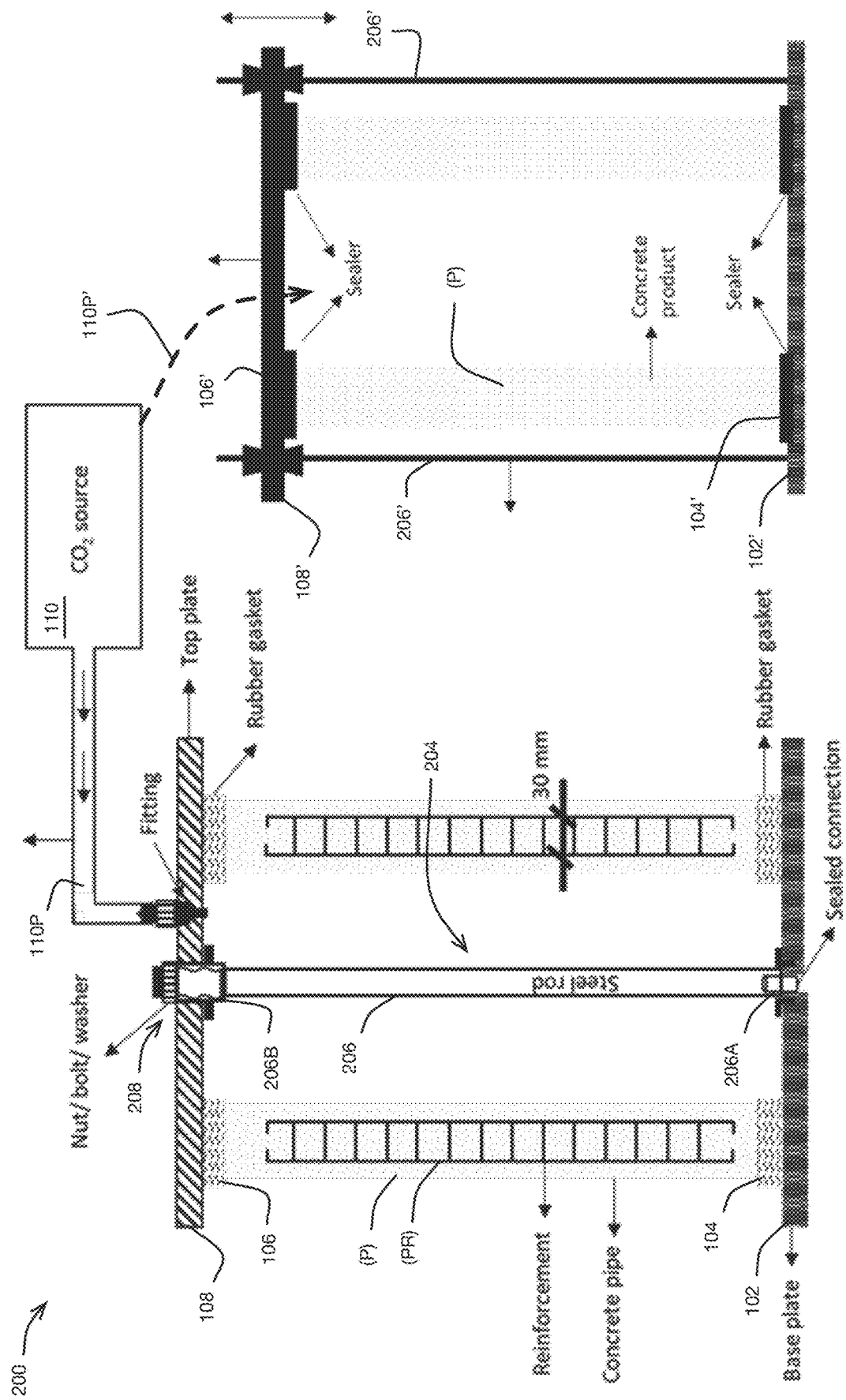
FIG. 2A is a schematic of a system for curing a concrete product, according to another embodiment.
FIG. 2B is a schematic of a sealing mechanism for one or more concrete products, according to another embodiment.

Now referring to FIG. 2A, there is shown a system 200 for curing a precast concrete product (P). The system 200 is similar to the system 100, and therefore the corresponding parts of the system 200 are labeled with the same reference numerals as used with respect to system 100.

A difference between the system 100 and the system 200 is that the system 200 includes a cover plate 108 that is mounted to a height control system 204. In this embodiment, the height control system 204 includes a vertically oriented support member 206, such as a steel rod for example. The support member 206 is at its lower end 206A connected to the base 102 via a suitable connection, such as a sealed connection to prevent escape of CO2 from the cavity (C) through an interface between the support member 206 and the base 102. At its upper end 206B, once the cover plate 108 reaches to the proper position, the support member 206 connects to a center of the cover plate 108 via a translating assembly 208 received over the upper end 206B of the support member 206. In other embodiments, such as for example when the concrete product is shaped to be positionable around the support member 206 by horizontally moving the product proximate to and in some embodiments over the support member 206, the cover plate 108 may remain connected to the translating assembly 208 while the concrete product (P) is being placed into position. In other embodiments, different configurations of the sealing mechanism may be used. For example, as shown in FIG. 2B, the sealing mechanism may have a support member such as a frame that includes one or more rods 206' disposed at one or more distances from each other that are selected to allow one or more concrete products (P) to be moved under the cover plate 108' while the cover plate 108' is movably/translationally connected to the one or more rods 206'. Once in position, the translating assembly 208', whether manual and/or automatic, may be operated to move the cover plate 108' into position to seal the inside(s) of the concrete product(s) (P). To this end, and as shown with a double-ended arrow in FIG. 2B, the translating assembly 208' may be configured to be movable/translatable up and down. In an embodiment, once the cover plate 108' seals the concrete product(s) (P) it may be fixed in place via one or more suitable mechanisms, which may be automatic or manual (e.g. bolts/nuts). FIG. 2B thus shows a different embodiment of a sealing mechanism, which may be connected to a CO2 source, such as the CO2 source of FIG. 2A, and may thus be a part of the system 200. Any number of sealing mechanisms may be used to cure multiple concrete products (P) in parallel. Any number of CO2 sources may be used for each concrete product (P) and/or sealing mechanism.

The translating assembly 208 may be threaded onto a corresponding thread on the upper end 206B of the support member 206 and may be manually operable by rotation thereof about the support member 206 in one of two directions to translate the cover plate 108 up or down relative to the support member 206. It is contemplated that any other suitable construction of the translating assembly 208 may be used, including but not limited to an actively actuated translating assembly 208 that may be controlled via one or more suitable actuators, such as electric motors, that may be operatively connected to a suitable controller, such as a computer for example. Since these details may be conventional, they are not described herein in detail. In other embodiments, the translating assembly 208 may be a different type of translating assembly, such as a hydraulic and/or an electric translating assembly operable to provide for the functionality of the system 200 as described herein.

System 300

Figure 3:
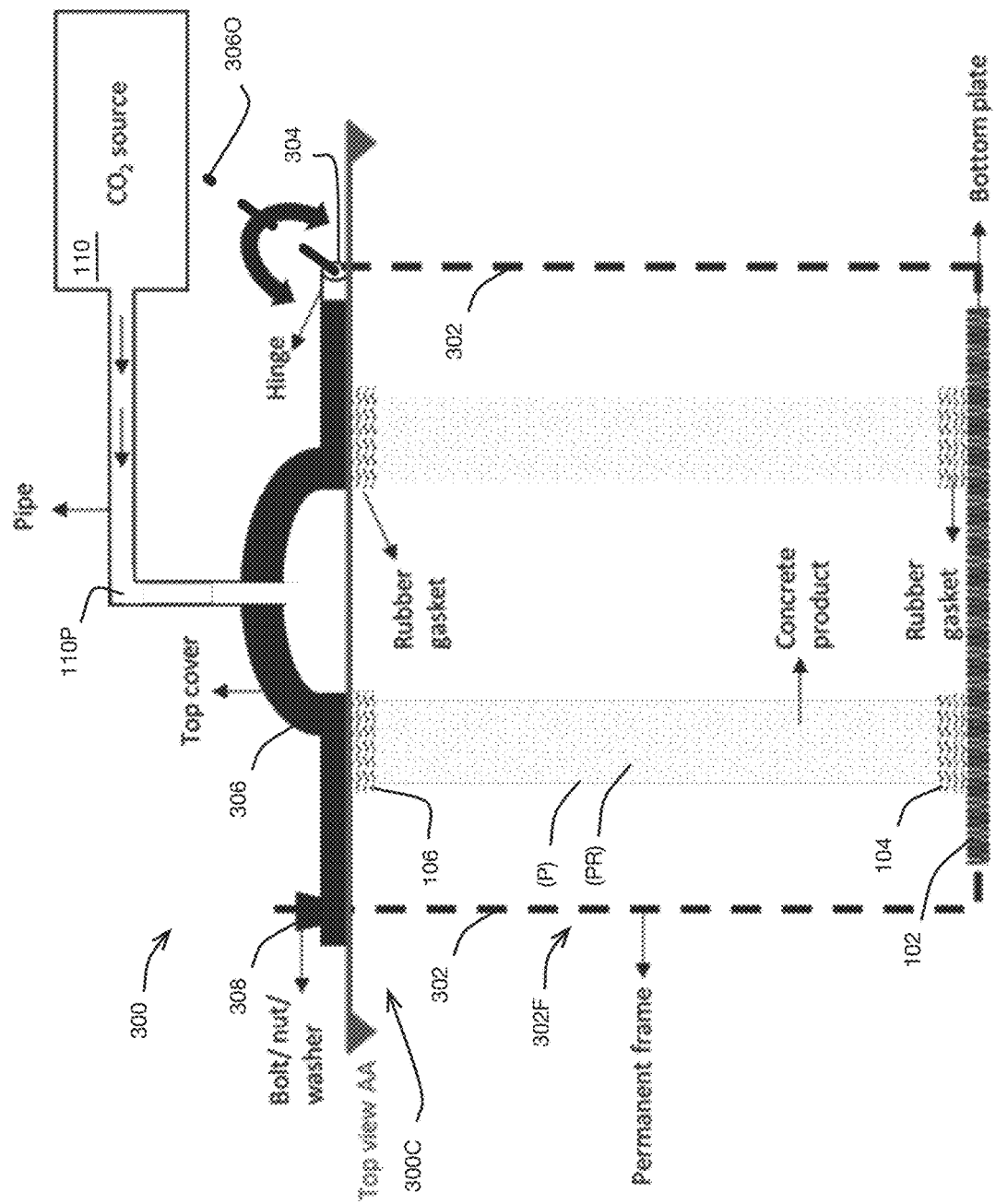
FIG. 3 is a schematic of a system for curing a concrete product, according to another embodiment.
Figure 4:
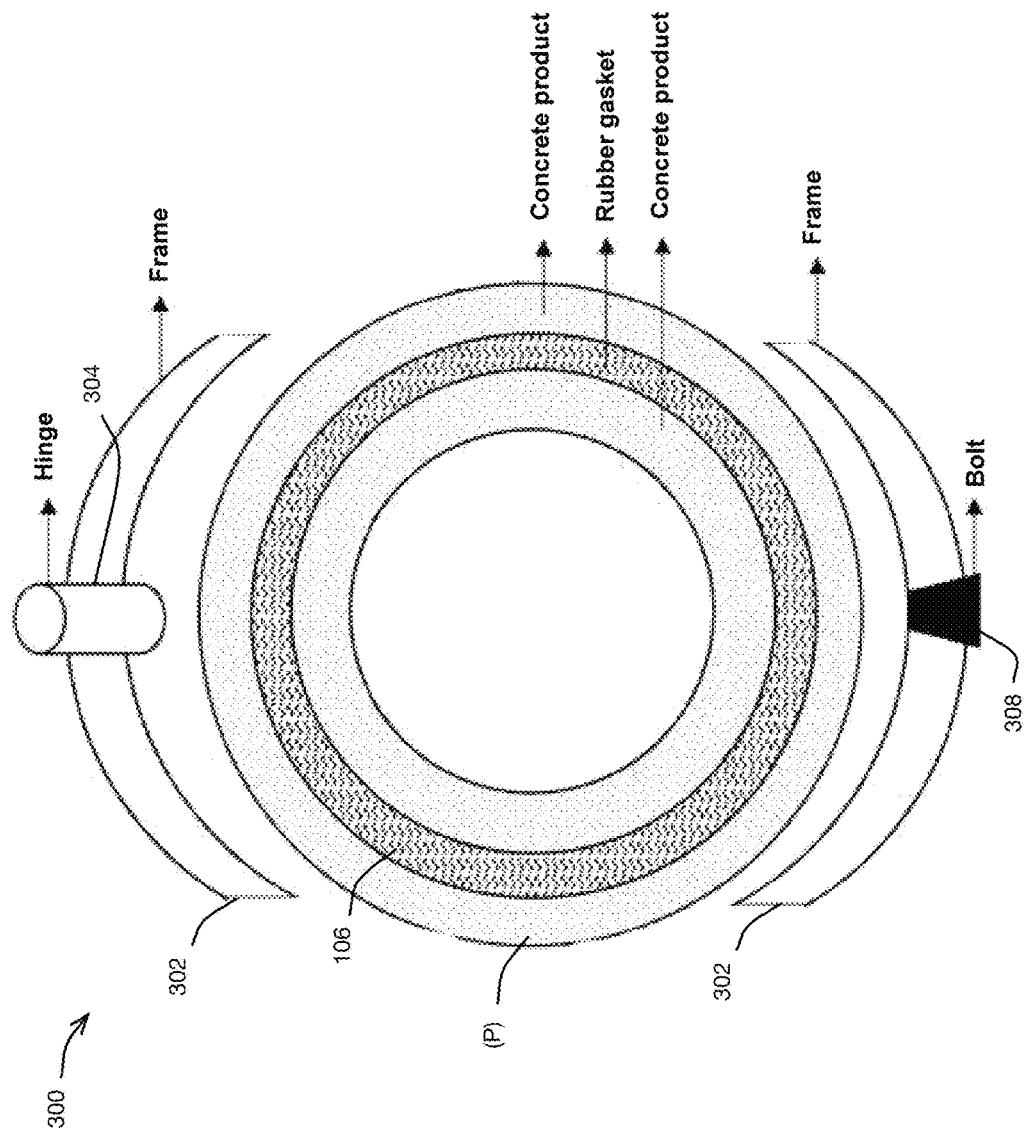
FIG. 4 is a schematic cross section of a part of the system of FIG. 3.

Now referring to FIGS. 3 and 4, there is shown a system 300 for curing a precast concrete product (P). The system 300 is similar to the system 100, and therefore the corresponding parts of the system 300 are labeled with the same reference numerals as used with respect to system 100.

A difference between the system 100 and the system 300 is that the system 300 includes one or more frame members 302 forming a frame that supports the cover plate 306. The one or more frame members 302 may be disposed vertically and may be optionally connected to the base 102. In another example, the frame can be attached to the floor or placed on the floor. In some embodiments, a single frame member 302 may form the frame 302F. The frame 302F in this embodiment is open on opposed lateral sides of the precast concrete product (P), as shown in FIG. 4, and is thus does not form a chamber over the precast concrete product (P). In other embodiments, the frame 302F may be different. The frame/support 302F may be larger in size than concrete product (P) in order to encompass the concrete product (P). The frame/support 302F may be made of steel, iron, stainless steel, FRP, plastic or aluminum, although these are non-limiting examples. The frame/support 302F may not need to be covered and/or may be made using one or more meshes.

Another difference between the system 100 and the system 300 is that in the system 300, the cover plate 306 is hinged, via one or more hinges 304 for example, to a top portion of the frame 302F so as to be movable between a closed position 306C and an open position 306O (shown in dashed line in FIG. 3). In this embodiment, and although need not be the case in other embodiments, the cover plate 306 is pivotable about the one or more hinges 304 between the closed position 306C and the open position 306O.

In the closed position 306C, the cover plate 306 encloses the cavity (C) in the precast concrete product (P), to enable a CO2 curing process to take place as described herein below. In the open position 306O, the cover plate 306 does not obstruct the top portion of the frame 302F sufficiently to enable the precast concrete product (P) to be inserted into the frame 302F for curing, and to enable the precast concrete product (P) to be removed from the frame 302F after curing. It is contemplated that any other movable connection, such as a translational joint, may be used instead of or in addition to the hinge 304.

As shown in FIG. 3, in this embodiment, one of the frame members 302 is threaded at a top end thereof and passes through a slot or aperture in the cover plate 306 when the cover plate 306 is in the closed position 306C. A bolt and/or nut, and/or other securement locks the cover plate 306 in the closed position 306C by being attached to the top end of that frame member 302 and/or may be tightened to increase compression of the upper seal(s) 106 by the cover plate 306. It is contemplated that any suitable securement may be used. In some embodiments, the securement may be omitted.

Now referring to FIG. 4, as shown in this embodiment the upper seal 106 is annular and thinner than a wall of the precast concrete product (P). In at least some embodiments and applications, this helps improve the enclosure of the cavity (C) and placement of the precast concrete product (P) into the system 300. In some embodiments, the upper seal 106 may have a different thickness and/or shape. Now referring to FIG. 5, in some embodiments, the cover plate 306 may have a different shape.

Figure 5:
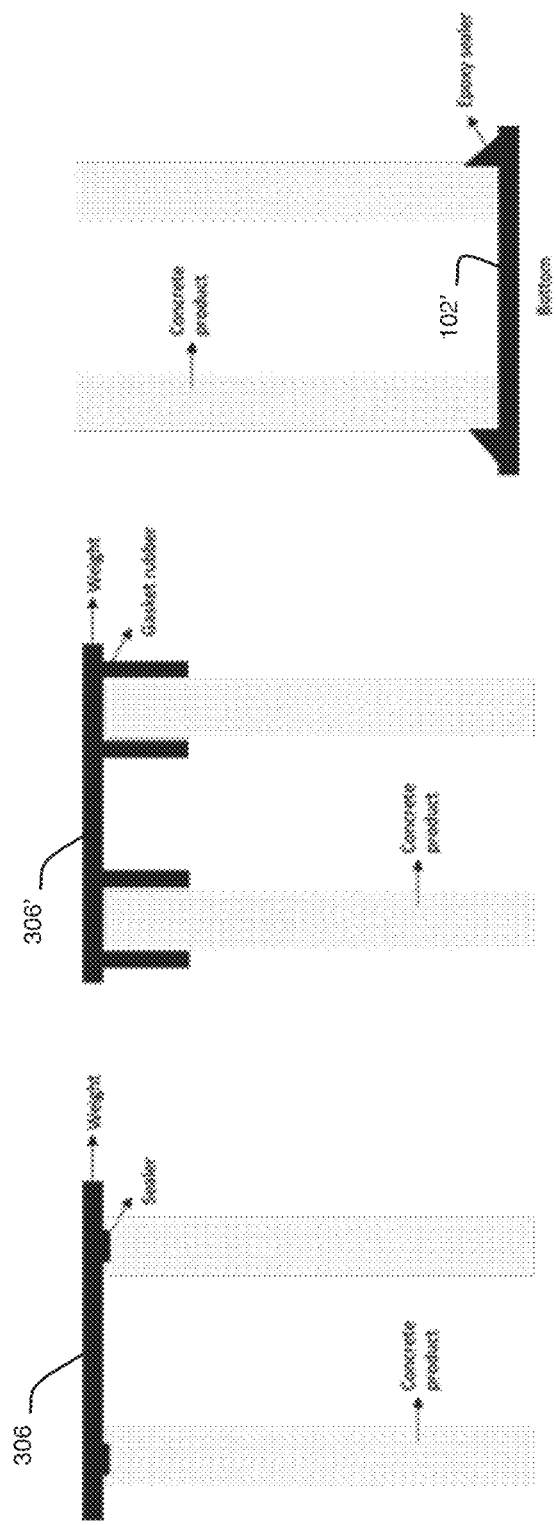
FIG. 5 is a schematic of non-limiting embodiments of examples of alternative of a cover plate, and a schematic of a base, of the system of FIG. 1.

One alternative example of the cover plate 306 is shown in the center drawing of FIG. 5 and labeled as 306'. Still referring to FIG. 5, in some embodiments, the base 102 may be separate from the floor on which at least part of the system 300 may be positioned, and may have different suitable shapes. One alternative example of the base 102 is shown in the right drawing of FIG. 5 and labeled as 102'. In some embodiments, such as in the non-limiting alternative embodiment 102' for example, the lower seal(s) 104 may be part of the base 102' and/or may be omitted.

System 400

Figure 6:
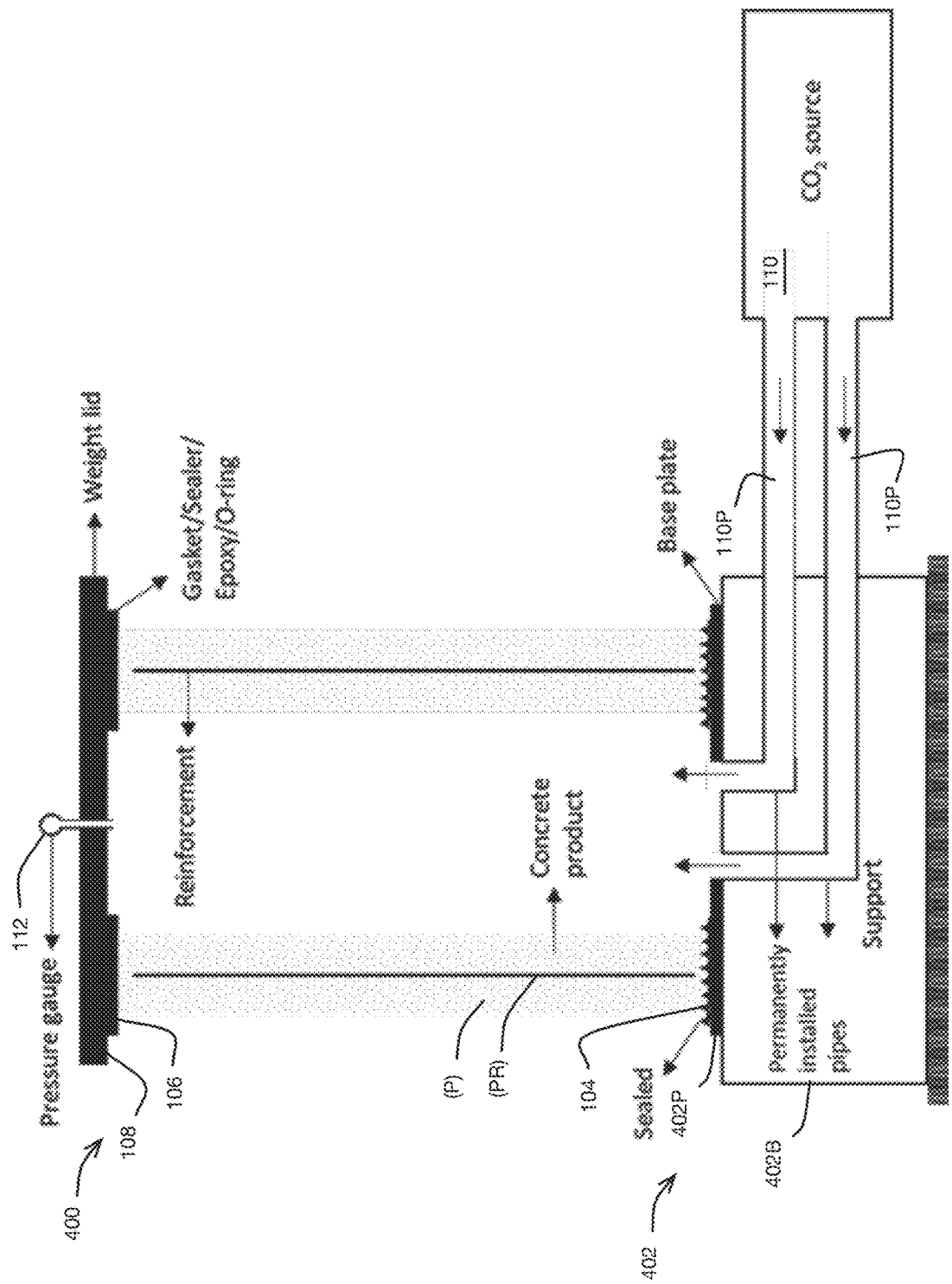
FIG. 6 is a schematic of a system for curing a concrete product, according to another embodiment.

Now referring to FIG. 6, there is shown a system 400 for curing a precast concrete product (P). The system 400 is similar to the system 100, and therefore the corresponding parts of the system 300 are labeled with the same reference numerals as used with respect to system 100.

A difference between the system 100 and the system 400 is that the system 400 has a base 402 that includes a base portion 402B, which may be for example cast from concrete or otherwise made part of a floor for example (or as another example may be separate from the floor), and a base plate 402P disposed on the base portion 402B. In some embodiments, the base plate 402P may be an integral part of the base portion 402B and/or may be omitted. As shown, in this embodiments, the lower seal 104 is an integral part of the base plate 402P, although this may not be the case in other embodiments.

As shown, the CO2 conduits 110P from the CO2 source 110 pass through the base portion 402B of the base 402 and are positioned to open into the cavity (C) of the precast concrete product (P) when the precast concrete product (P) is positioned in the system 400, over the outlets of the CO2 conduits 110P. In some embodiments, the system 400 may be configured to cure precast concrete products (P) that may have more than one cavity (C). In some such embodiments, the system 400 may have one or more CO2 conduits 110P per each cavity (C) of the precast concrete products (P), such as for example more than two CO2 conduits 110P in total.

Description of Cover plate: it can be weight, hinged or guided on rod (similar top cover systems as 100, 200 and 300).

System 500

Figure 7:
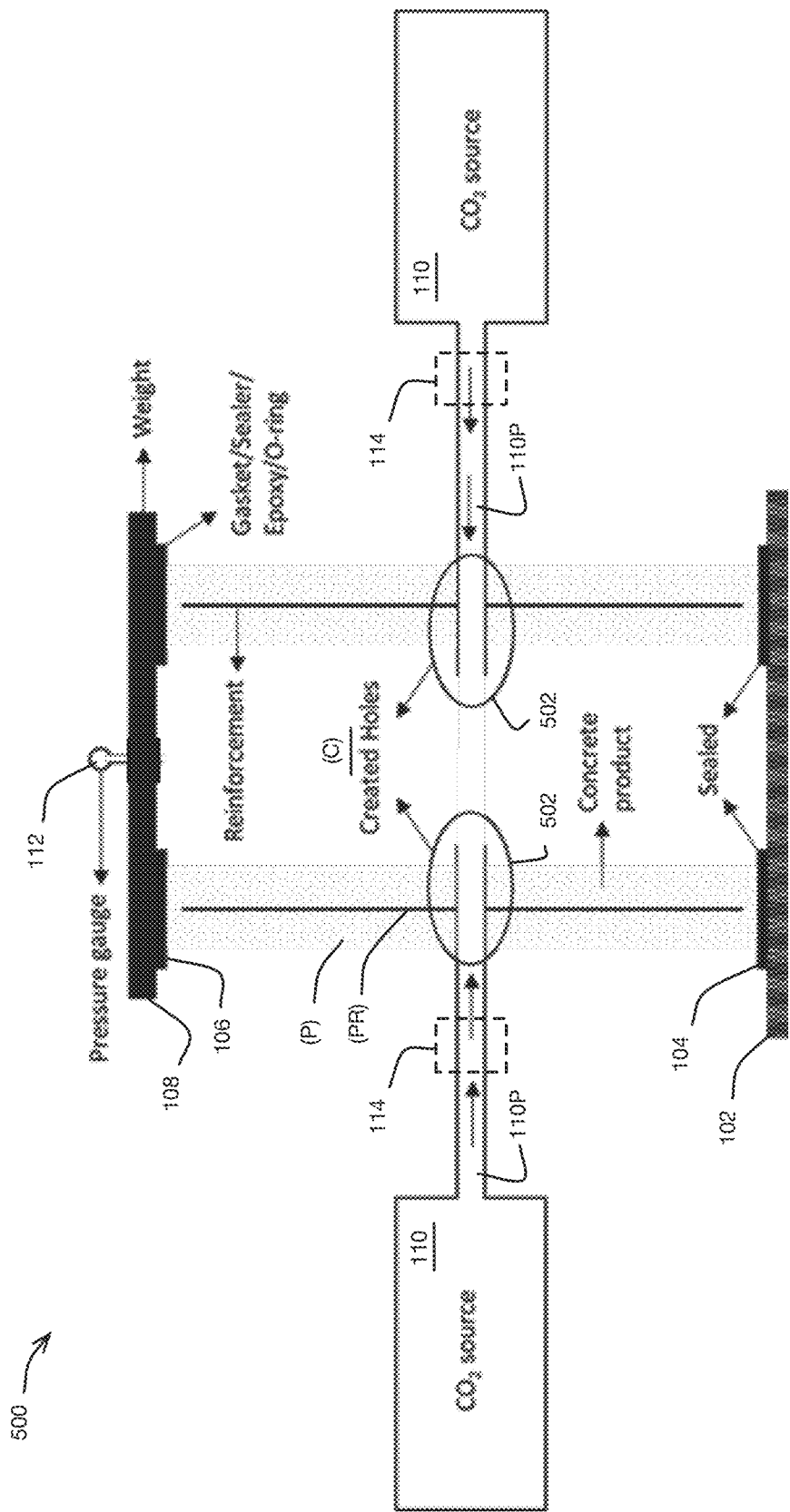
FIG. 7 is a schematic of a system for curing a concrete product, according to another embodiment.

Now referring to FIG. 7, there is shown a system 500 for curing a precast concrete product (P). The system 500 is similar to the system 100, and therefore the corresponding parts of the system 500 are labeled with the same reference numerals as used with respect to system 100.

A difference between the system 100 and the system 500 is that the system 500 has one or more CO2 conduits 110P that traverse a wall of the precast concrete products (P) as shown. While in this embodiment, the system 500 has two CO2 conduits 110P, in other embodiments, the system 500 may have one, or more than two, CO2 conduits 110P with corresponding CO2 conduit(s) 110P traversing the wall(s) of the precast concrete products (P) to inject CO2 into the cavity (C) thereof during a curing process.

In some embodiments, the system 500 may include an injection assembly 502 for each of the one or more CO2 conduits 110P, which may help limit or preclude CO2 leakage out of the cavity (C) during a curing process. Now referring to FIG. 7, there are shown three non-limiting examples of the injection assembly 502 are shown, and labeled 502A, 502B, 502C, respectively. The injection assembly 502A may include an epoxy or other suitable sealer 504 in the interface between the CO2 conduit 110P and the aperture defined through the wall of the precast concrete product (P) that receives the CO2 conduit 110P therein. In some embodiments, the epoxy and/or other suitable sealer 504 that may be injected into the interface for example, although other installation methods may also be used.

The injection assembly 502B may include a rubber stopper 506 with suitable one or more apertures defined therethrough, which may be attached to or inserted into the outer end of the CO2 conduit 110P and/or into the interface between the CO2 conduit 110P and the aperture defined through the wall of the precast concrete product (P) that receives the CO2 conduit 110P therein, as shown. The rubber stopper 506 is one example of a sealing member 506 that may be used. Other sealing member(s) are also contemplated.

For example, the injection assembly 502C may include an expanding plug 508 with suitable one or more apertures defined therethrough, which may be attached to or inserted into the outer end of the CO2 conduit 110P and/or into the interface between the CO2 conduit 110P and the aperture defined through the wall of the precast concrete product (P) that receives the CO2 conduit 110P therein, as shown. The expanding plug 506 is another example of the sealing member 506 that may be used. Other sealing member(s) are also contemplated.

System 600

Figure 8:
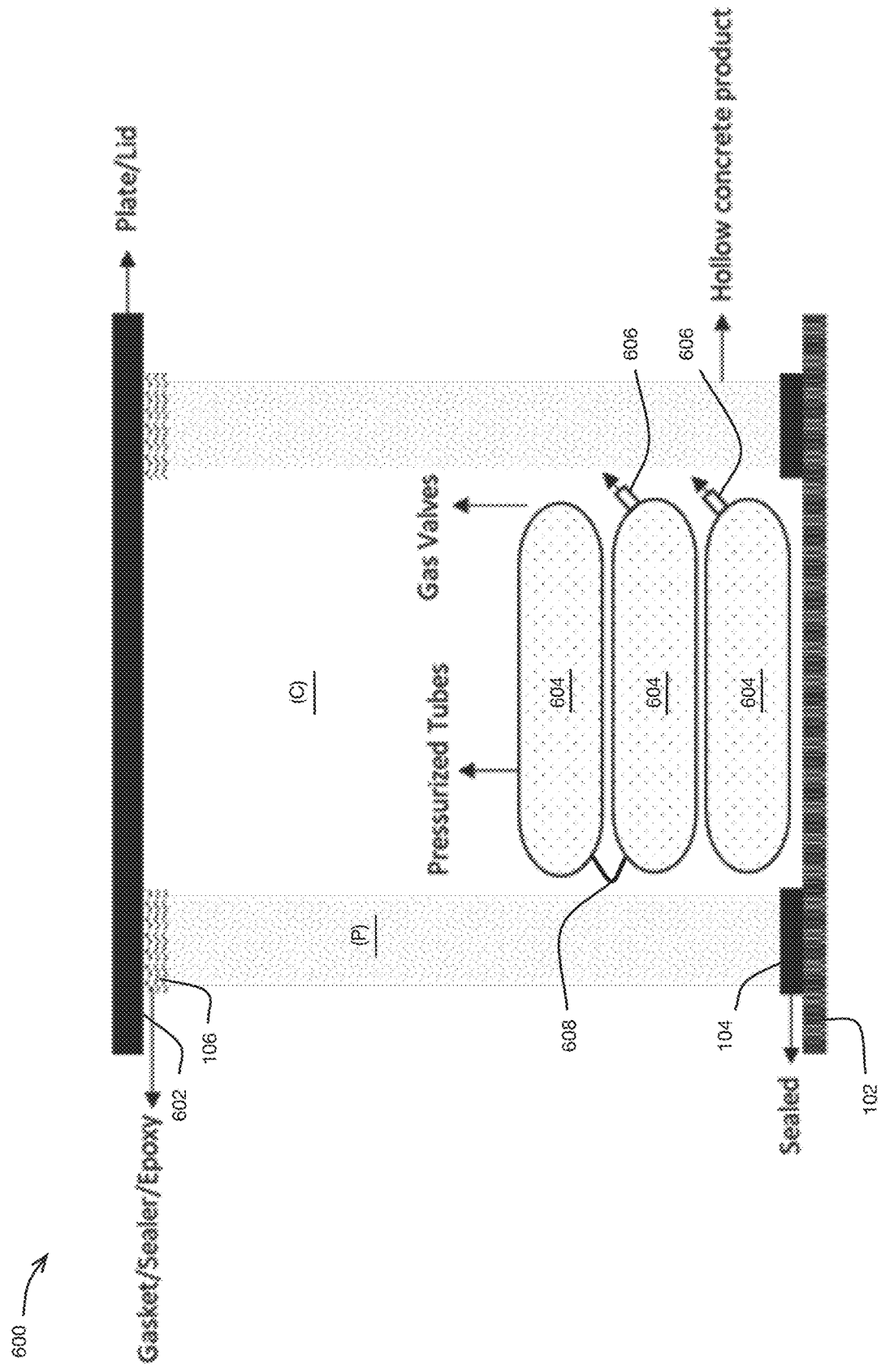
FIG. 8 is a schematic of a system for curing a concrete product, according to another embodiment.

Now referring to FIG. 8, there is shown a system 600 for curing a precast concrete product (P). The system 600 may use a base 102 and one or more seals 104 as described above. However, in this embodiment the system 600 may have a cover plate 602 that is dimensioned and/or be made from material(s) selected so as to provide a weight of the cover plate 602 that balances the CO2-containing gas pressures that may be present within the concrete product (P). In other embodiments of the system 600, the cover plate 602 may be for example hinged or guided on rod(s) similar to the other embodiments described herein (e.g. similar to top cover systems of 100, 200, and/or 300). The CO2-containing gas in this embodiment may be provided by one or more containers 604 containing pressurized CO2-containing gas(s). In some embodiments, the container(s) 604 may be vehicle tires and/or tire tubes as shown schematically in FIG.

8. In some embodiments, to reduce waste, the container(s) 604 may be used vehicle tires and/or tubes. The container(s) 604 may retrofitted with one or more valve(s) 606, such as conventional valves which may be passive or powered, configured to release the gas to provide for pressurization of the concrete product (P) as described in this document. In some embodiments, one or more of the containers may be interconnected via one or more conduits 608 so as to reduce a number of valves 606 to less than one-per-container 608. In some embodiments, and although this may be different in other embodiments, the valve(s) 606 may be configured to provide an overall flow rate of the gas that is less than 30 standard cubic feet per minute. This may allow to have a single valve 606 per multiple containers 604. In some embodiments, the CO2-containing gas in the container(s) 604 may have a CO2 concentration between 5% and 99.5% by mass.

In some embodiment's, the container(s) 604 may be sized to occupy between 10% and 98% of the volume of the cavity (C) and may be positioned therein to be out of contact with the inner wall(s) of the concrete product (P) that define the cavity (C). In an aspect, this may lower CO2 volume/content needed to fill the cavity (C) and may allow the cavity (C) to be filled by CO2 more quickly, as smaller free volume of the cavity (C) would be available. In addition, at the end of the carbonation process, a smaller amount of $CO_2$ remains inside the cavity (C). This makes the exhaustion process faster and the uses less CO2 for the carbonation process. The built-up pressure between the concrete walls of the product (P) and the container(s) 604 allows the gas/CO2 to penetrate the concrete walls and allows CO2 to react with binder in the concrete walls in the presence of water, thereby carbonating/increasing strength of the product (P). In some applications and depending on use for example, the object(s) 604 may be re-filled and re-used for each new concrete product (P) to be carbonated using the system 600, or may be sized and/or pressurized to carbonate two or more concrete products (P) before needing a re-fill.

System 700

Figure 9:
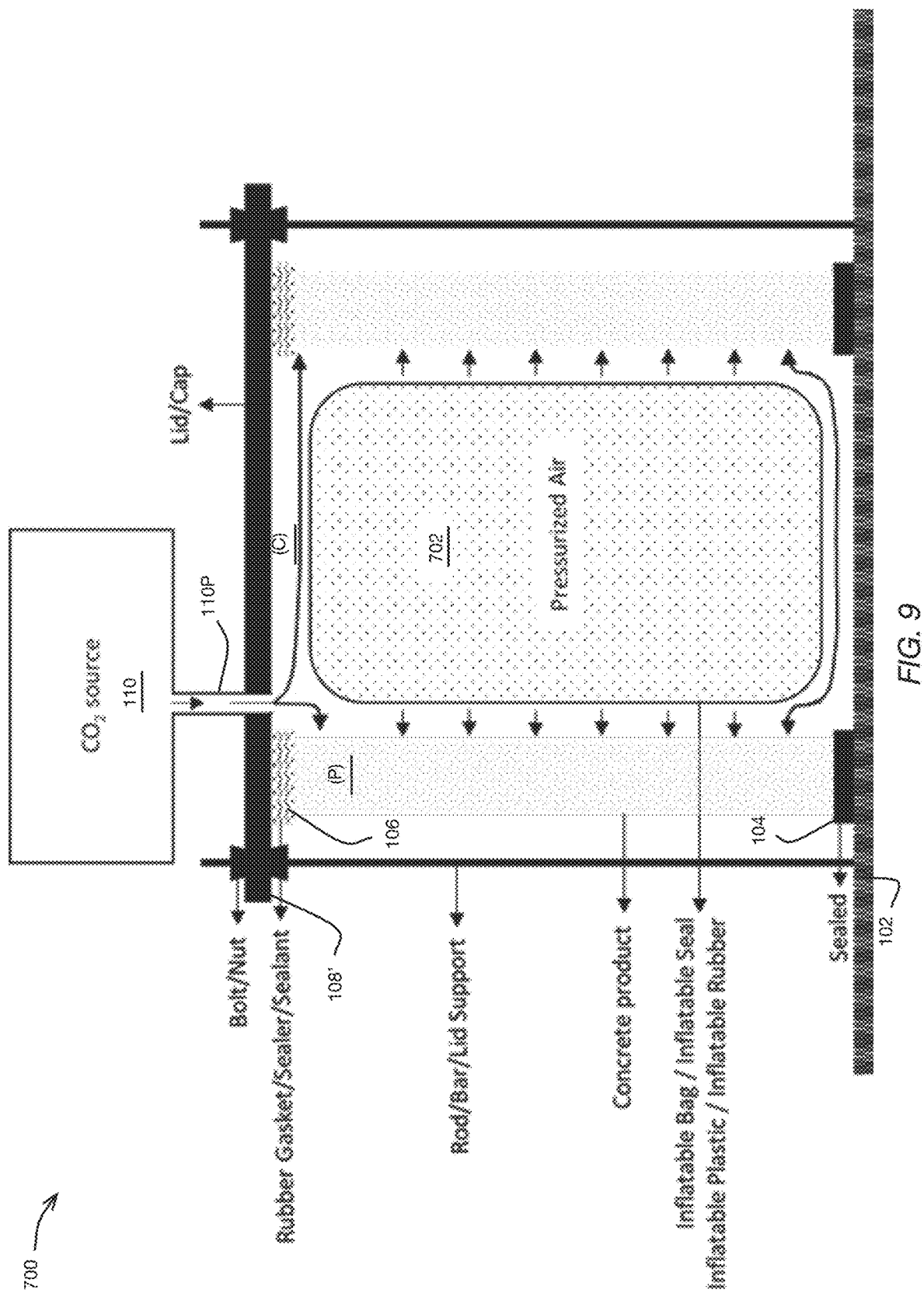
FIG. 9 is a schematic of a system for curing a concrete product, according to another embodiment.

Referring now to FIG. 9, yet another embodiment of a system 700 is shown. Similar to the system 600, the system 700 includes the step of reducing the CO2-finable volume of the cavity (C) with one or more objects 702. As shown, in some embodiments, the object(s) 702 may be a balloon containing a gas, i.e. inflatable bag, inflatable plastic or inflatable rubber is placed inside the cavity (C) and may be inflated to occupy between 10% and 98% of the volume of the cavity (C), with goals and outcomes similar to those described with respect to the system 600 above.

The filling gas can be air, nitrogen, carbon dioxide, oxygen or any other gas. The object 702 holding the gas can be made of flexible materials such as plastic. The gas pressure inside the object 702 may be higher than the pressure of $CO_2$ introduced into the cavity (C). Furthermore, the object 702 may be made of steel, iron, aluminum or FRP. The object 702 may be re-used for each new product (P) to be carbonated using the system 700.

System 800

Figure 10:
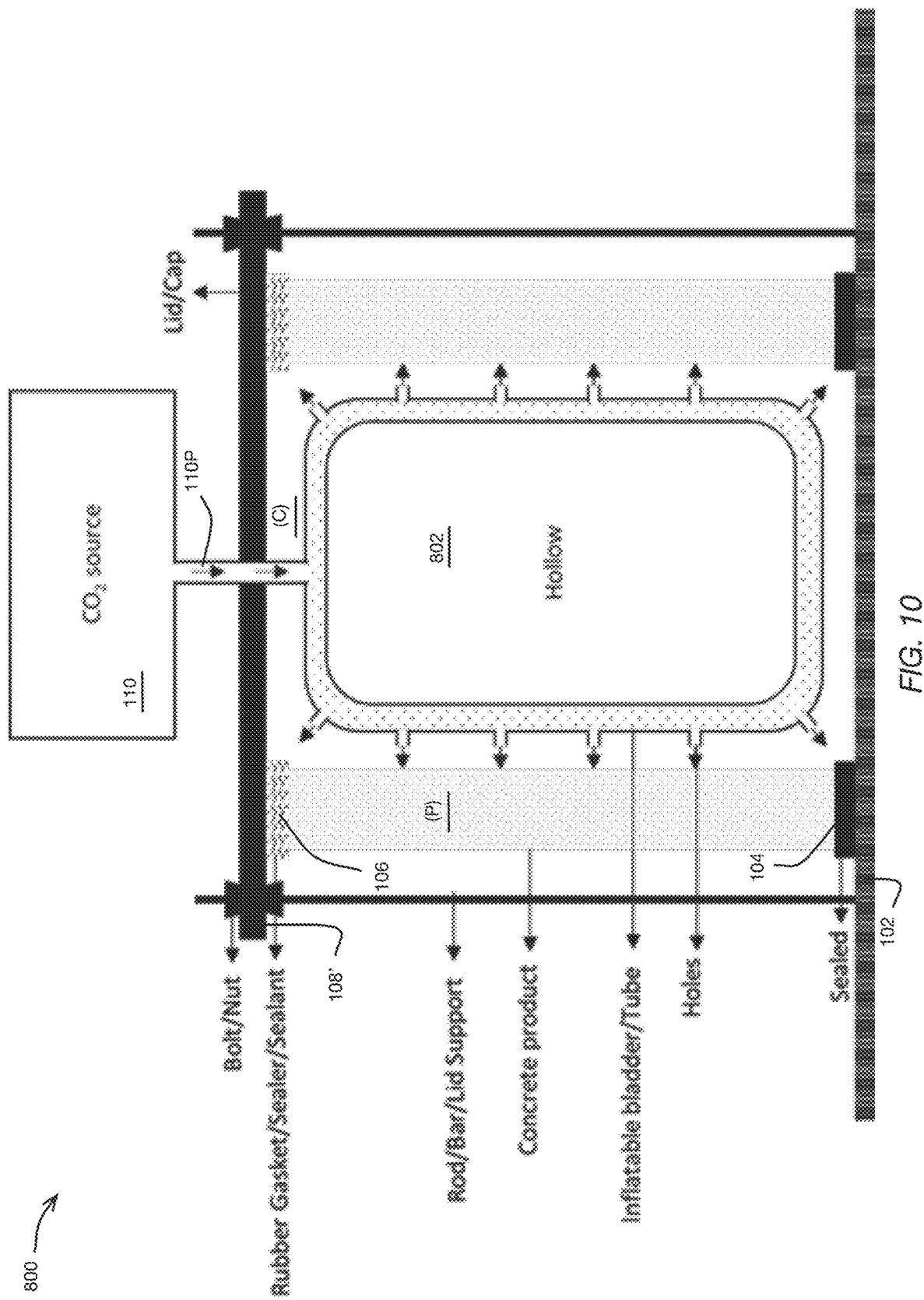
FIG. 10 is a schematic of a system for curing a concrete product, according to another embodiment.

Referring now to FIG. 10, yet another embodiment of a system 800 is shown. Similar to the system 700, the system 800 includes the step of reducing the CO2-fillable volume of the cavity (C) with one or more objects 802. As shown, in some embodiments, the object(s) 802 may be a hollow manifold, bladder, tube, and the like.

System 900

Figure 11:
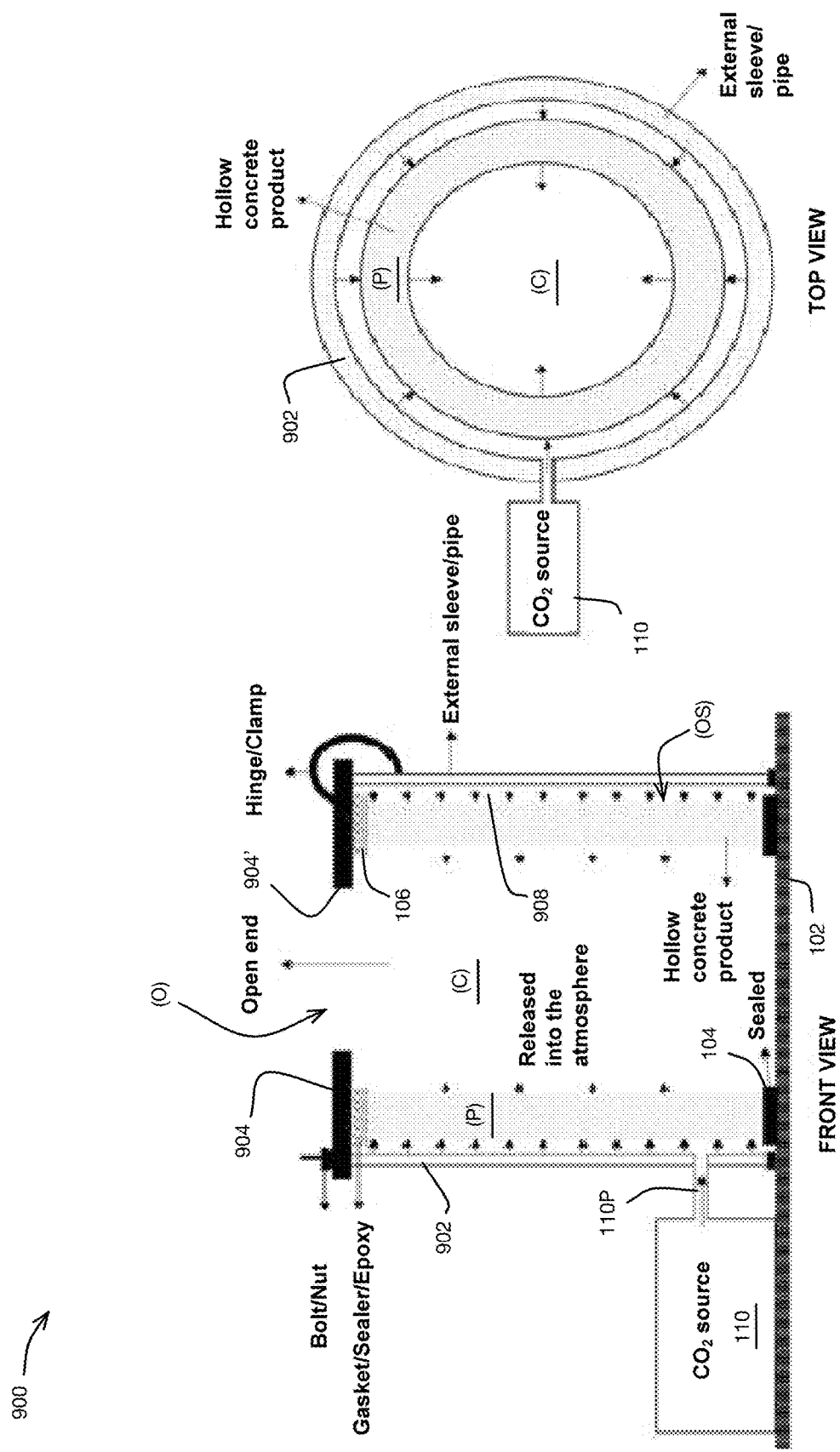
FIG. 11 is a schematic of a system for curing a concrete product, according to another embodiment.
Figure 12:
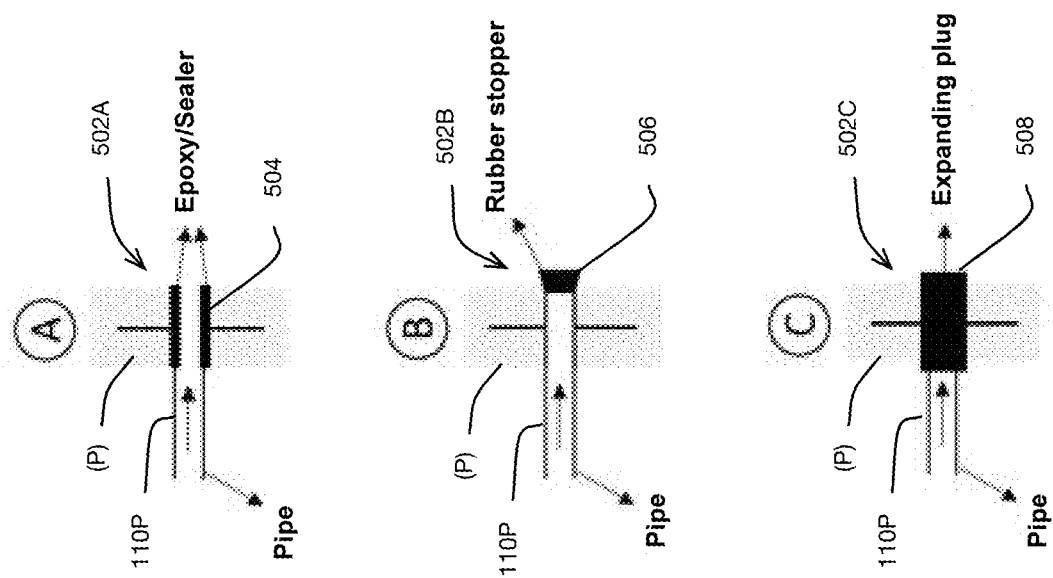
FIG. 12 is a schematic of various sealing portions of the systems according to some embodiments described herein.

Referring now to FIG. 11, yet another embodiment of a system 900 is shown. The system 900 includes an external sleeve 902 disposed proximate the outer walls of the concrete product (P) and receiving CO2 from one or more CO2 sources 110. The sleeve 902 should be made of steel, iron, aluminum, FRP, plastic or any other suitable material. The sleeve 902 may be made of impermeable materials preventing the gas from escaping. Accordingly, when introduced into the sleeve 902, the CO2 pressurizes at the outer surfaces of the walls of the product (P) and therefore penetrates the walls inwardly into the cavity (C) as shown with arrows in FIG. 11. The sleeve 902 may in shape correspond to the shape of the product (P) and may at one end (e.g. bottom) be enclosed by the base 102 and seal(s) 104, and at the top end may be enclosed/sealed by a cover plate 904 which may be implemented similar to any one of the embodiments described above, except that the cover plate 904 may include an opening 906 positioned to be in fluid communication with the cavity (C). The opening 906 may allow the CO2 to escape the cavity (C) after having passed thru the walls of the product (P). In some embodiments, the opening 906 may be used to de-pressurize the cavity (C) so as to create a larger pressure differential across the walls of the product (P) and thereby increase CO2 infiltration through the walls. In some cases this may help speed up the carbonation process. To de-pressurize the cavity (C) any suitable means may be used, such as one or more conventional fans, pumps, vacuums and the like.

As an example, the system 900 may be used to execute a carbonation process whereby after an optional pre-conditioning of the product (P) as described herein, the product (P) is encompassed by the sleeve 902. The gap between the product and the sleeve 902 may be more than 1 mm from all sides/edges. Carbon dioxide gas is introduced into the space between the product (P) and sleeve 902. The concentration of injected carbon dioxide may be higher than 5%. The gas penetration into the concrete walls is thereby executed uni-directionally inward into the cavity (C). The gas may be either injected at the constant flow rate during the carbonation process or variable flow rate. In the case of variable injection flow rate, the flow rate may be lower than 30 standard cubic feet per minute, at the beginning and may be gradually increased over time. The initial low-flow rate approach may help reduce the porosity of concrete product (P) without causing significant leakage. When calcium carbonates and other carbonation reaction products are generated and partially fill the pores in the concrete product (P), a higher carbon dioxide flow rate may be applied. This approach may help develop a rapid early strength and may reduce significant leakage.

The rate of CO2 pressure built-up pressure may depend on the rate of gas injection, volume of space between the sleeve 902 and product, concrete mixture proportion, permeability of concrete, porosity, concrete type and product geometry. The carbonation reaction may be an exothermic reaction. No additional and external heat/temperature may be required for the carbonation curing process. The activation process may be executed at the ambient temperature and ambient humidity. The built-up pressure between the concrete walls and external sleeve 902 may allow the gas to penetrate the concrete walls and allow carbon dioxide to react with the binder in the presence of water. In this configuration, the reaction starts from the outer surface of the product (P). In some embodiments, the gas injection and carbonation curing process may be continued for at least 5 minutes.

A portion of the gas inside the space between the product (P) and sleeve 902 may travel through the concrete wall and exit from the inner layer of the product (P). At the end of the carbonation curing process, if some carbon dioxide remains inside the space, it may be released before the product (P) is released from the system 900. In another configuration, the sleeve 902 may be sized to be positioned inside the cavity (C) to encompass the inner concrete walls of the product (P) and the $CO_2$ gas may thus penetrate from the inner layer to the outer layer of the product (P).

Materials

The concrete products (P) referred to in the description of the various embodiments of the systems 100-900 above may be made from prior art concrete with any known conventional method in prior art. In some embodiments, concrete may include Portland cement or other hydraulic cements as the main cementing material. Fresh concrete may be zero-slump concrete, wet concrete or self-compacting concrete (SCC) for example. Concrete products may be either dry cast or wet cast.

In some embodiments, concrete may be produced with slag-based binder. The main binder in the production of slag-based concrete may be slag from steel and stainless steel factories. Other by-products materials such as zinc, iron, copper and sludge may be also utilized as the binder. Various steel slags may be collected from steel factories that practice different methods of steel production. Among the types of slag that may be incorporated as the main binder in production of slag-based concrete may be: stainless steel slag, reducing steel slag, oxidizing steel slag, converter steel slag, electrical arc furnace slag (EAF slag), basic oxygen furnace slag (BOF slag), ladle slag, fast-cooled steel slag and slow-cooled steel slag.

The calcium oxide content of slag may be more that 10%, more than 15%, and in some embodiments more than 20%. The silica oxide content may be more than 6%, more than 8%, and in some embodiments more than 12%. The total iron oxide content of slag may be less than 40%, and in some embodiments less than 30%. Steel slag may have a cumulative calcium silicate content of at least 20% and a free lime concentration of less than 10%. All of the above values are based on the mass/weight of slag. In some embodiments, the bulk density of the slag may fall within a range of 1.0 to 2.0 g/cm3 and its apparent density may vary from 2.0 to 6.0 g/cm3.

Slags may be ground to a smaller size in some embodiments before being incorporated into the mix to produce concrete. Grinding of slag may be performed with any mechanical machine such as a ball mill, rod mill, autogenous mill, SAG mill, pebble mill, high pressure grinding rolls, VSI or tower mill. The grinding process may be executed either wet or dry. If a wet process is chosen for grinding the slag, the ground slag may be either dried completely or semi-dried at the end of the grinding. Passing slags through sieves is an alternative option to obtain slag with a smaller grain size. Slags passed through mesh #10 (2000 microns), mesh #50 (297 microns), mesh #200 (74 microns), mesh #400 (37 microns) may be used as binder. Sieves may be utilized to screen slags either after or before grinding. Thus, one of, or combination of, grinding and screening methods may be executed in order to obtain slag with a proper particle size.

In some embodiments, the slag may be pulverized and/or screened to a Blaine fineness of at least 150 m2/kg, and at least 200 m2/kg. In some embodiments, for using slag in slag-based concrete, fifty percent of slag may be smaller than 200 microns (D50=200), smaller than 150 microns (D50=150), smaller than 100 microns (D50=100), smaller than 50 microns (D50=50), smaller than 25 microns (D50=25), and in some embodiments smaller than 10 microns (D50=10). In some embodiments, the free lime content of the slag may be reduced with any standard known method in the prior art before it is incorporated into the mix. In other embodiments, the slag may first be aged to reduce its calcium hydroxide content and then incorporated into the mix. Slag content may be no less than 5% of the weight of concrete, and in some embodiments no less than 20% of the weight of concrete.

Various types of aggregate, including natural or artificial normal weight and lightweight aggregates, may be incorporated into the concrete as filler in the production of slag-based concrete. Examples of potential lightweight aggregates includes natural lightweight aggregate (e.g. pumice), expanded clay aggregate, expanded shale aggregate, recycled plastic aggregates and expanded iron slag aggregate. Other usable aggregates include: crushed stone, manufactured sand, gravel, sand, recycled aggregate, granite, limestone, quartz, chalk powder, marble powder, quartz sand and artificial aggregate. These aggregates may be incorporated into the mix as fine and/or coarse aggregates. Aggregate content may be as high as 90% of the weight of concrete.

Mineral and chemical admixtures may be introduced into the mix in some embodiments. Mineral admixtures may include fillers, supplementary cementitious materials, and pozzolanic materials. Possible mineral admixtures include one or a combination of: fly ash, calcinated shale, silica fume, zeolite, GGBF, limestone powder, hydraulic cement and non-hydraulic cement. Chemical admixtures meanwhile may be introduced into the mix to satisfy specific properties. Possible chemical admixtures include but are not limited to: accelerators, retarders, viscosity modifying agents, air entertainers, foaming agents, ASR inhibitors, anti-wash-out, corrosion inhibitors, shrinkage reducers, crack reducers, plasticizers, super plasticizers, water reducers, water repellants, efflorescence controls and workability retainers. Fibers may be added in some embodiments to the slag-based concrete. One or combination of cellulous fiber, glass fiber, micro synthetic fibers, micro synthetic fibers, natural fibers, PP fibers, PVA fibers and steel fibers may be incorporated into the mix.

Slag-based concrete products may be either dry cast or wet cast concrete. The fresh slag-based concrete may be made as zero-slump concrete, wet concrete or self-compacting concrete (SCC). For example, in some embodiments, a water to slag ratio, by mass, of self-compacting concrete (SCC) may be more than 0.2. In some embodiments, the water to slag ratio, by mass, of wet cast concrete may be higher than 0.1. In some embodiments, the water to slag ratio, by mass, of dry cast concrete may be less than 0.5.

Mixing and Production

The concrete products (P) referred to in the description of the various embodiments of the systems 100-900 above may be made using prior art mixing methods. In some embodiments, the concrete products (P) may be made by uniformly mixing all batch ingredients which may include: binders, aggregates, chemical admixtures, mineral admixtures, fibers and water. For example, in one approach, dry ingredients are mixed for at least 1 minute, then water and other liquid ingredients are added after the mixing. In another approach, water may be gradually added during the mixing of dry ingredients. The water content of wet-cast concrete and self-compacting concrete may be higher than that of dry-cast or zero-slump concrete, if no water-reducing admixture is incorporated. Any existing method, technique and equipment used in the prior art to produce the concrete products (P) may be implemented for the production of zero-slump concrete, wet concrete and self-compacting/consolidating conventional concrete and slag-based concrete.

Reinforcement

As shown in FIG. 2A for example, the concrete products (P) referred to in the description of the various embodiments of the systems 100-900 above may have a wall thickness of between about 1 mm and 350 mm for example (although any other thicknesses may likewise be used), and may be optionally reinforced with reinforcing material (PR) such as carbon steel, stainless steel, and/or FRP reinforcement bars. In one embodiment, before casting a concrete product (P), the mould is prepared and reinforcing material, in some embodiments, are placed inside the mould before casting. In some embodiments, the diameter of the bars (PR) may vary from 1 mm to 100 mm, with a yield strength between 100 MPa and 2100 MPa for example. In some embodiments, the reinforcements (PR) of a precast concrete product (P) may be designed in accordance with codes and standards that may apply to a jurisdiction for which the precast concrete product (P) may be designed. These particular measurements and characteristics are non-limiting examples only.

Casting and Placement

Fresh concrete may be cast into a suitable conventional mould with any known method in the prior arts. The fresh concrete can be zero-slump concrete (dry concrete), wet concrete or self-compacting concrete. The mould, made of steel, iron, aluminum, plastic or FRP, should be lubricated prior to casting to ease the demoulding process. Wet-cast concrete may be vibrated inside the mould by internal or external vibrators, in some embodiments and applications for no more than 120 seconds. The dry-cast concrete may be formed with a combination of pressing/compacting and vibration. No internal or external vibration may be required for self-compacting concrete. The formed concrete product can be either dry cast or wet cast concrete. Steel, FRP or other types of concrete reinforcement may be installed inside the mould prior to casting, to reinforce concrete for example.

Preconditioning

Prior to a given carbonation activation process, a concrete product (P) may be subjected to preconditioning. Preconditioning is optional and depends on the type of concrete (conventional or slag-based), type of concrete product (dry-cast or wet-cast) and mixture proportions. Under certain conditions, preconditioning is not necessary. The process of preconditioning reduces the water content of the concrete to a second water-to-binder ratio by weight prior to CO2 curing. In some embodiments, the preconditioning step may be executed either prior to or following demoulding.

In preconditioning of some demoulded concrete products (P) (out of mould), and depending on the methods and/or materials used to produce a given concrete product (P): after demoulding, the concrete product (P) product may begin to reduce its water content to generate extra voids inside the concrete. The rate of evaporation of the demoulded concrete depends on the temperature, relative humidity, initial water content, surface area of the product and air flow if the mould is exposed to wind. In addition to natural evaporation, in a preferred embodiment, one or a combination of the following evaporation and/or heating equipment may be used to accelerate the evaporation rate: heating elements, drum heaters, floor heating mats, fans, heaters, blowers or fan heaters.

The heating appliances (e.g. elements/wires or floor heating mats or drum heaters) may be installed so as to cover the exterior or interiors surfaces of the demoulded concrete product (P). The elements heat the demoulded concrete walls and may accelerate the evaporation process to reduce the moisture content of the concrete. Fans, heaters, fan heaters and blowers may be placed inside the hollow demoulded concrete product (P) (to reduce the moisture content from inside) or may be placed in front of the exterior surfaces (to reduce the moisture content from outside).

These preconditioning steps may continue until the initial water-to-binder content, based on mass, is reduced by up to 95%, 80%, 70%, 60%, 50%, 40%, 30%, 20%, 10% or 1%. The increase of porosity defined in terms of volume created within the demoulded concrete by either of the above preconditioning methods in concrete is 90%, 60%, 50%, 40%, 30%, 20%, 10%, 5% or 0.1% of the concrete volume. The water-to-binder ratio of the preconditioned concrete may be less than the first water-to-binder ratio by weight.

Preconditioning of concrete inside the mould may occur before a given concrete product (P) is demoulded. In this case, the concrete product (P) may be preconditioned and/or set inside the mould before it is demoulded. For example, for wet-cast concrete and self-compacting concrete, it may be preferred that the concrete is preconditioned and/or set inside the mould, if preconditioning is required.

The mould may be kept at ambient temperature and humidity, allowing free water to gradually evaporate. This may allow the partial or full hydration and setting of the binder. The hydration and setting rate may depend on the type of binder, its chemical compositions and the concrete mixing proportions. Fans, heaters, fan heaters, blowers, heating elements/wires, floor heating mats or drum heaters may be utilized to accelerate the preconditioning and setting of concrete while concrete remains inside the mould. In another example, the concrete product (P) may remain inside the mould to fully or partially set without implementing any of the above-mentioned preconditioning method. In another example, a portion of the preconditioning step may occur inside the mould and the remaining portion may occur out of the mould.

Demoulding

The concrete products (P) may be demoulded immediately after casting or may be set/preconditioned/hydrated inside the mould for example for up to 7 days before demoulding. In another example, the concrete can be immediately demoulded and subjected to the carbonation curing right after casting. Demoulding may be undertaken in a given embodiment where the compressive strength of the concrete is at least 0.01 MPa. These particular measurements and characteristics are non-limiting examples only.

Methods of Curing/Carbonation

Figure 13:
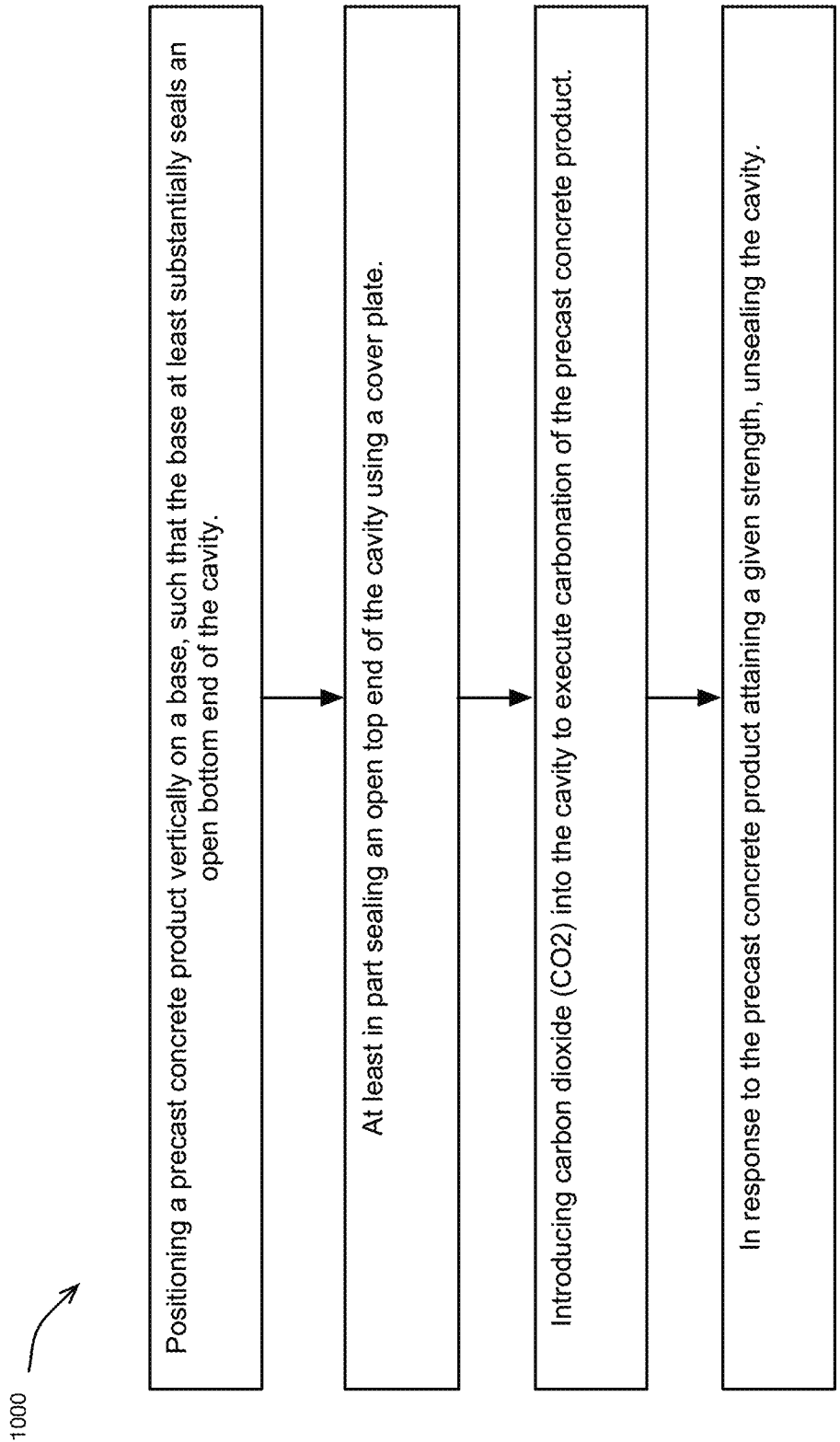
FIG. 13 shows a method of curing a concrete product.

With the systems 100-900 described in this document in mind, methods of curing concrete products (P) are described next. A non-limiting example of the methods of the present technology, method 1000, is shown in FIG. 13.

In one particular embodiment of a method of curing a precast concrete product (P) demoulded concrete product is sealed from the bottom and top, or sides, such as using the base(s) 102, the cover plate(s) 108, the seal(s) 104, 106 and/or the injection assembly(ies) 502 described above. As described above, in some embodiments, sealing may be done by rubber gasket 106, sealers 504, epoxy 504, O-ring 106 or any other known sealing method in the prior art. This may limit or at least substantially prevent CO2 from leaking out of the cavity (C) of the concrete product (P). In another example, the bottom sealer/seal 104 may be placed inside the mould before casting the concrete product (P) and the concrete product (P) may be cured according to one or more methods described herein while being at least partially in the mold. In examples where only the weight of the cover plate 108 is used to seal the top of the concrete product (P), the cover plate 108 may apply pressure to the upper seal(s) 106 to ensure minimum CO2 leakage from the upper end of the concrete product (P).

The weight of cover plate(s) 108 may be selected so as to not crack or damage the concrete product (P). The weight and thickness of the cover plate(s) 108 may be chosen to be more than the applied force to keep the cover plate(s) 108 in place. In some embodiments, the thickness of the cover plate(s) 108 may be more than 1 mm. In some embodiments, the cover plate(s) 108 may be made of steel, iron, stainless steel, FRP, plastic or aluminum. Depending on which of the systems 100-900 described above are used, the cover plate(s) 108 may or may not be connected anywhere to the base 102, and may thus simply rest on top of the concrete product (P) to cover the cavity (C). As seen above, in some such embodiments, the cover plate(s) 108 include at least one aperture that is connected to one or more CO2 sources 110 via one or more CO2 conduits 110P. In some embodiments, the diameter of each such aperture may be between about 1 mm and 500 mm. These particular measurements and characteristics are non-limiting examples only.

The CO2 may be introduced in pure form, or as part of a suitable gas, such as an inert gas, through the aperture(s) in the cover plate(s) 108 and/or via the CO2 conduit(s) 110P. One non-limiting example is a gas containing CO2 that may be introduced into the cavity (C) to cure the optionally preconditioned concrete product (P) may be introduced at ambient temperature at a concentration of, for example, 5%, 10%, 20%, 30%, 40%, 50%, 60%, 70%, 80%, 90%, or 99.5% CO2 by mass.

The $CO_2$ may be injected to fill the cavity (C) inside the concrete product (P). In some such embodiments, the $CO_2$ may be injected to fill the cavity (C) to atmospheric pressure or one or more pressures above atmospheric pressure. In some embodiments, the internal pressure may monitored with the pressure gauge 112 installed in the cover plate(s) 108. As described above, in some embodiments, the internal pressure may monitored and controlled via a controller and flow control valve(s) 114, using the pressure sensor(s) 112 installed in the cover plate(s) 108.

In some embodiments, the concrete product (P) may be carbonated under CO2 gas for a time of between 5 minutes and 15 minutes for example depending on the concentration of the CO2 for example. In some embodiments, the CO2 curing process may continue for up to 72 hours. These particular measurements and characteristics are non-limiting examples only.

In some embodiments of the concrete product (P), no external energy or heat may be required during the carbonation curing process. The CO2 activation process may be an exothermic reaction that increases the temperature of the concrete product (P).

In some embodiments, the carbonation curing process may be executed at atmospheric pressure, or under a constant carbon dioxide pressure, above atmospheric pressure or under various gas pressures during the activation process. In some embodiments, the carbonation curing process may be executed either variable CO2 pressure. For example, in some embodiments, an initial pressure of the CO2 in the cavity (C) may be brought to between 0 and 10 psig for between, for example, 5 minutes and 15 minutes, depending on the particular composition of the concrete product (P).

The pressure of the CO2 in the cavity (C) may then be increased gradually over time to one or more higher pressures. Such initial low-pressure approaches may help reduce the porosity of concrete without causing significant leakage. In some cases, when calcium carbonates and other carbonation reaction products are generated and they partially fill the pores in concrete, a higher carbon dioxide pressure may be applied. Such an approach may help in developing a rapid early strength of the concrete product (P) and may help reduce leakage.

In some embodiments, at each pressure increment, the carbonation curing may continue for at least 5 minutes. This interval approach may help prevent carbon dioxide from escaping through the outer layer of product and may also help protect the integrity of the concrete product (P) at early ages. In some embodiments, the pressure of the CO2/gas in the cavity (C) may be brought down at the end of the carbonation activation process to minimize the amount of carbon dioxide remaining inside the cavity (C) before the cavity (C) is unsealed. In some embodiments, the remaining gas may be vented out into the atmosphere or recycled at the end of the curing process. In some embodiments, the recycling step(s) may be executed without bringing down the gas pressure. This recycled gas may be used for the next batch production.

The applied pressure of the gas in the cavity (C) may vary from atmospheric pressure to for example 100 psig, depending on the thickness of the walls, porosity, maturity of concrete, concrete mixture proportion, shape, and concrete ingredients of the concrete product (P), and/or on the sealing methods used to seal the cavity (C). In some embodiments, the cavity (C) may not be fully air tight. Part of the injected gas may be allowed to leak from the ends of the product or may fully penetrate through the wall's thickness and eventually be released from the outer layer of the concrete product (P).

In some embodiments, once a target strength (and/or other target specification(s), such as for example specified in The cured concrete product (P) should satisfy the minimum standard requirement described in ASTM/ACI/CSA/NBC, as may be applicable for one or more intended uses) of the concrete product (P) is achieved, the CO2 gas supply may be shut off to the cavity (C) such as via the flow control valve(s) 114 described above, the remaining gas in the cavity (C) may be recycled or simply vented to atmosphere, the cavity (C) may be opened such as by moving the cover plate(s) 108 to the open position 306O as described above, the CO2 conduit(s) 110P may be removed from the walls of the concrete product (P) (if any were inserted thereinto as described above), and the cured concrete product (P) may then be taken out of whichever system 100, 200, 300, 400, 500 was used.

In some embodiments in which a system is used with a hinged and/or secured covering plate 108, the hinging and/or securement may help reduce an effort required to operate the system and/or may help reduce a weight of the covering plate 108 that is required, respectively. In embodiments where no automated jack/movement/lifting system is used to move the cover plate(s) 108 between the closed and open positions 306C, 306O, such as described above with respect to system 200, the cover plate(s) 108 may be lifted or otherwise moved between the closed and open positions 306C, 306O by a crane, forklift or other suitable equipment. The same or similar suitable equipment may be used to take the cured concrete product (P) out of the system 100, 200, 300, 400, 500.

After the cured concrete product (P) is taken out, the system 100, 200, 300, 400, 500 may then be ready to receive a new precast concrete product (P) therein for curing using one or more of the methods described above. In methods in which one or more CO2 conduit(s) 110P are inserted through the wall(s) of the precast concrete product (P), after the precast concrete product (P) is cured/carbonated and the $CO_2$ conduit(s) 110P are removed from the walls, the aperture(s) remaining in the concrete product (P) after curing may be filled with a suitable material, such as filled with cement paste, grout, concrete, mortar, polymer or epoxy.

Figure 14:
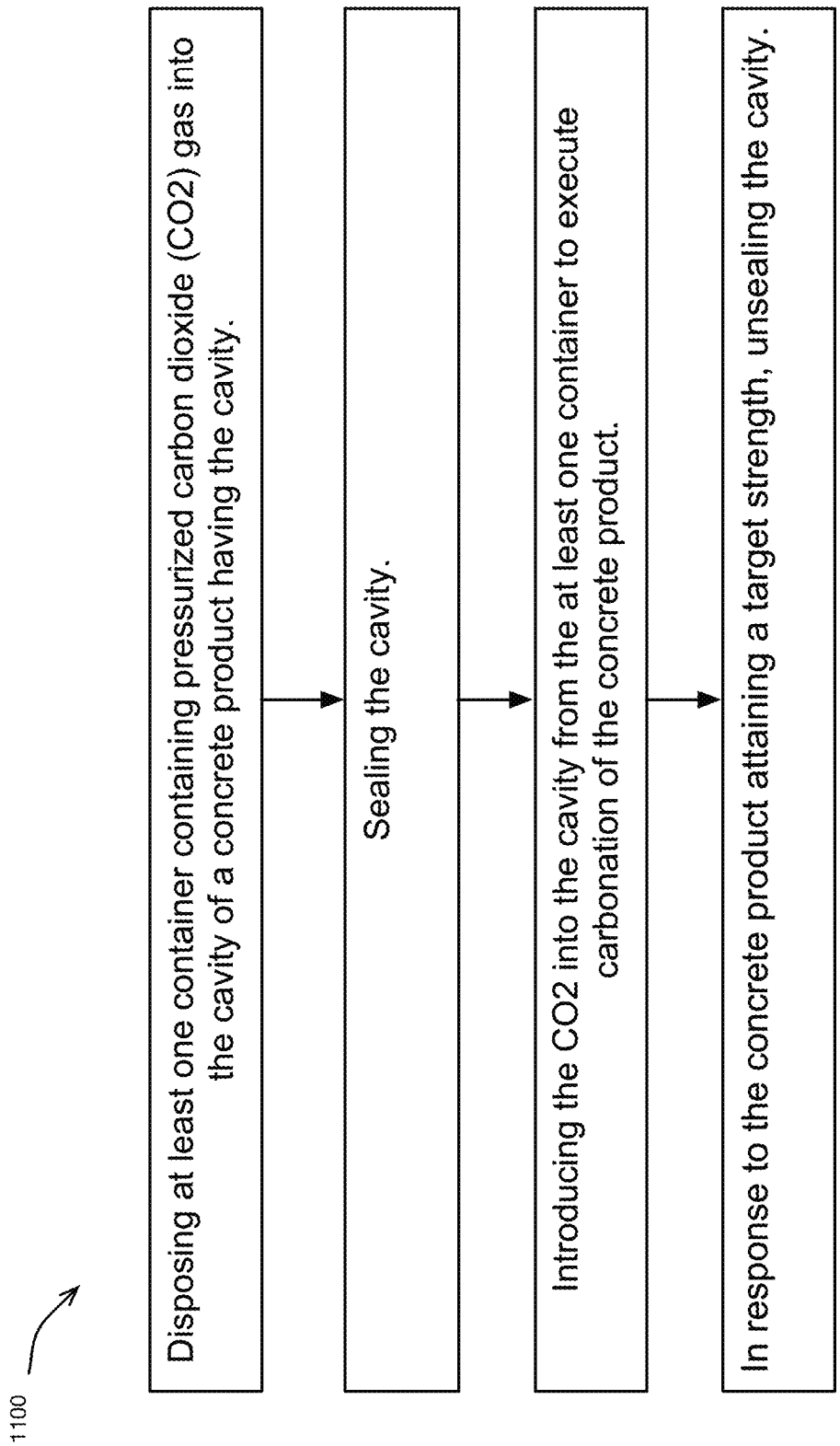
FIG. 14 shows another method of curing a concrete product.
Figure 15:
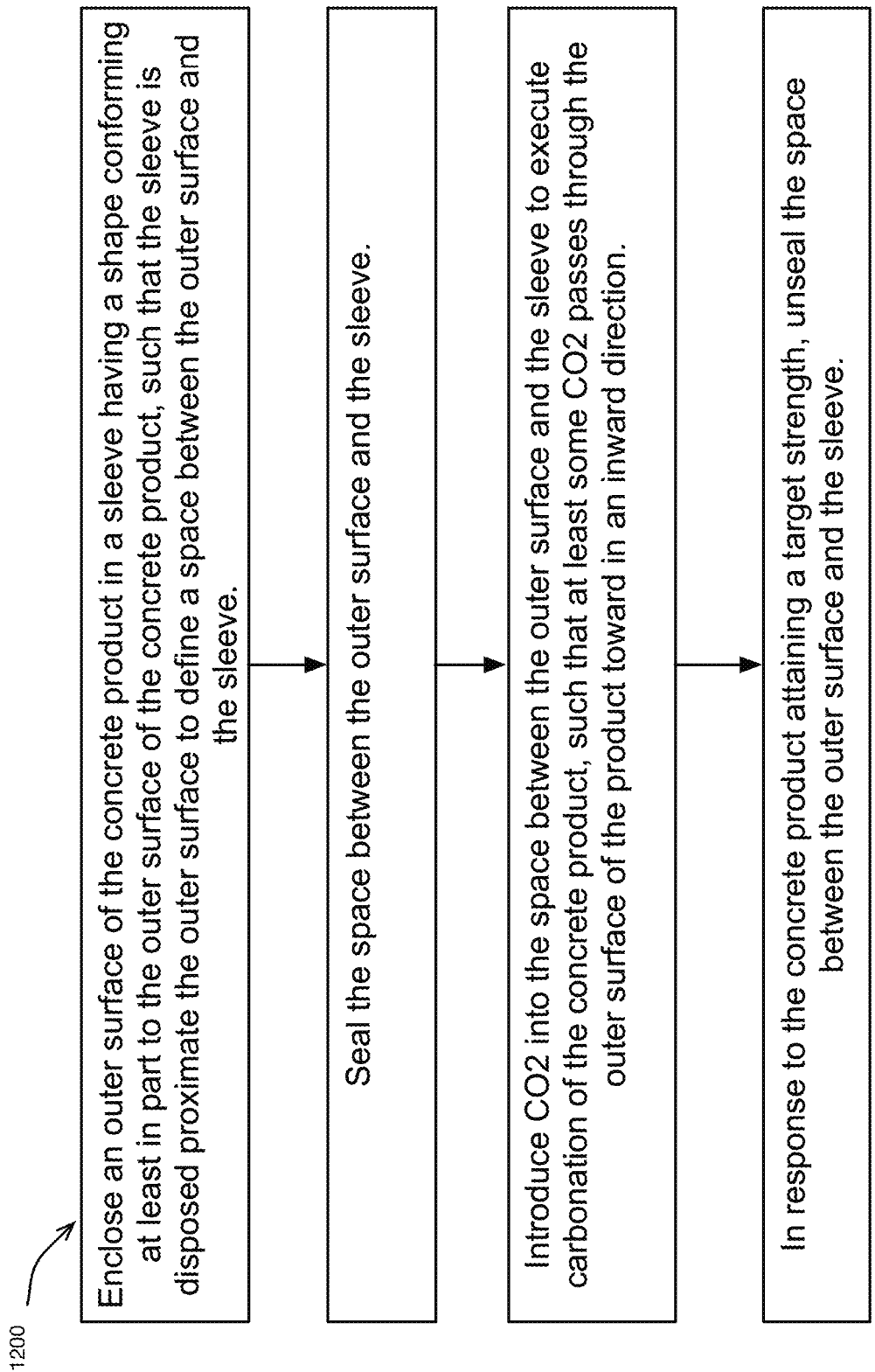
FIG. 15 shows another method of curing a concrete product.

Now referring to FIG. 14, there is shown yet another method 1100 for curing a concrete product (P) having a cavity (C) therein. The method 1100 may include disposing at least one container (e.g. 604) containing pressurized carbon dioxide ($CO_2$) gas into the cavity (C), sealing the cavity (C); introducing the $CO_2$ into the cavity (C) from the at least one container to execute carbonation of the concrete product, and in response to the concrete product attaining a target strength (and/or other target specification(s)), unsealing the cavity (C).

In some embodiments of the method 1100, the step of introducing the $CO_2$ into the cavity (C) may include pressurizing the cavity (C) to a first pressure for a first period of time, followed by increasing the pressure in the cavity (C) to a second pressure for a second period of time. In some embodiments of the method 1100, the at least one container may include at least one of a tire tube and a tire. In some embodiments of the method 1100, the introducing the $CO_2$ into the cavity (C) may include operating at least one valve fluidly connected to the at least one of the tire tube and the tire. In some embodiments of the method 1100, the sealing the cavity may be executed using a cover plate, such as a suitable one of the cover plates described above, and may further comprise balancing the first and second pressures with the cover plate such that the cover plate continues sealing the opening during presence of the first and second pressures. In some embodiments of the method 1100, the method 1100 may include casting and demoulding the concrete product prior to the sealing the cavity, and the step of introducing the $CO_2$ may be executed after and proximate in time to the step of demoulding. In some embodiments of the method 1100, the step of introducing the $CO_2$ may be executed immediately after the step of demoulding.

In some embodiments of the method 1100, the method 1100 may also comprise executing at least one of setting, hydration, and pre-conditioning steps with respect to the concrete product prior to the step of introducing the $CO_2$. In some embodiments of the method 1100, the method 1100 may also comprise hydrating the concrete product after completion of the step of introducing the $CO_2$. In some embodiments of the method 1100, the method 1100 may also comprise pressurizing the cavity to a pre-determined pressure of the $CO_2$. In some embodiments of the method 1100, the method 1100 may also comprise varying the pre-determined pressure of the $CO_2$. In some embodiments of the method 1100, the pre-determined pressure may be at least atmospheric pressure. In some embodiments of the method 1100, the method 1100 may also comprise sizing the at least one container to occupy between 10% and 98% of a volume of the cavity. In some embodiments of the method 1100, the at least one of the tire tube and the tire may be used (i.e. previously used products, thereby allowing reducing a footprint of the method 1100 on the environment). In some embodiments of the method 1100, casting of the product (P) may be executed as one of dry casting and wet casting. In some embodiments of the method 1100, the introducing the $CO_2$ may be executed by introducing a gas containing $CO_2$ at a concentration of between 5% and 99.5% $CO_2$ by mass.

Referring to FIG. 11, there is also provided a method 1200 of curing a concrete product (P), which may include enclosing an outer surface (OS) of the concrete product (P) in a sleeve 902 having a shape conforming at least in part, as shown in FIG. 11 for example, to the outer surface (OS) of the concrete product (P), such that the sleeve 902 is disposed proximate, also as shown in FIG. 11, the outer surface (OS) to define a space 908 between the outer surface (OS) and the sleeve 902, sealing the space 908 between the outer surface (OS) and the sleeve 902, and introducing $CO_2$ into the space 908 between the outer surface (OS) and the sleeve 902 to execute carbonation of the concrete product (P). As shown, in some embodiments, the step of introducing the $CO_2$ may include at least some of the $CO_2$ passing through the outer surface (OS) of the product toward in an inward direction (i.e. in a direction from the sleeve 902 into the concrete product (P)). In some embodiments of the method 1200, the method may also include, in response to the concrete product (P) attaining a target strength (and/or other target specification(s)), unsealing the space 908 between the outer surface (OS) and the sleeve 902, and for example taking the sleeve 902 off the concrete product (P) or taking the concrete product (P) out of the sleeve 902, depending on the particular embodiment of the system 900 used to execute the method 1200.

As seen in FIG. 11, in some such embodiments the concrete product (P) includes a cavity (C) therein and an opening into the cavity (C), and the enclosing the outer surface (OS) of the concrete product (P) excludes sealing the opening (O) into the cavity (C). Further as seen in FIG. 11, in some such embodiments, the enclosing the outer surface (OS) of the concrete product (P) may leave the opening (O) open, for example to facilitate passing of $CO_2$ through the walls of the concrete product (P). Yet further in some such embodiments, the introducing $CO_2$ into the space may be executed through the sleeve 902. Further as seen in FIG. 11, in some such embodiments, the sealing the space 908 between the outer surface (OS) and the sleeve 902 includes disposing a cover plate 904 over the concrete product (P), the cover plate 904 being operatively connected to the sleeve 902 at least during the step of introducing the $CO_2$, such as by being pivotably connected thereto for example or as described in any of the embodiments above as another example. As seen in FIG. 11, in some such embodiments the cover plate 904 may include an opening 904' therein, and the opening 904' may align at least in part with the opening (O) into the cavity (C) of the concrete product (P) when the cover plate 904 is disposed over the concrete product (P).

The systems and methods described herein may be used to produce concrete products (P) that may at least satisfy minimum standard requirement(s) described in ASTM/ACI/CSA/NBC. The systems and methods described herein may be used to produce concrete products (P) which may be made using one or a combination of hydraulic cement, non-hydraulic cement, slag, pozzolanic materials, fly ash, silica fume and calcium hydroxide as binder. The above description is meant to be exemplary only, and one skilled in the art will recognize that changes may be made to the embodiments described without departing from the scope of the present technology. For example, a given system for curing a precast concrete product (P) may have a combination of at least some of the features from one or more of the abovementioned embodiments. Still other modifications which fall within the scope of the present technology will be apparent to those skilled in the art, in light of a review of this disclosure.

The invention claimed is:

1. A method of curing a concrete product, the method comprising:
   obtaining a concrete product defining a cavity and an opening leading into the cavity, the cavity peripherally bounded by an inner surface of the demolded concrete product, the concrete product being a demolded concrete product, wherein the inner surface of the demoulded concrete product is exposed to the cavity and an outer surface of the demoulded concrete product is exposed to an environment outside the demoulded concrete product;
   positioning the demolded concrete product on a base;
   sealing the opening using a cover plate supported by the demoulded concrete product;
   introducing carbon dioxide ($CO_2$) gas into the cavity to execute carbonation of the demolded concrete product, thereby exposing the inner surface of the demolded concrete product to the $CO_2$ gas; and
   in response to the demolded concrete product attaining a target specification, unsealing the opening.

2. The method of claim 1, wherein introducing the $CO_2$ gas into the cavity includes pressurizing the cavity to a first pressure for a first period of time, followed by increasing the pressure in the cavity to a second pressure for a second period of time.

3. The method of claim 1, further comprising introducing the $CO_2$ gas through the cover plate and/or the demolded concrete product.

4. The method of claim 1, wherein the opening is one of an open top end of the demolded concrete product and an open bottom end of the demolded concrete product, and positioning further comprises placing the other one of the open top end and the open bottom end onto the base so as to seal the other one of the open top end and the open bottom end.

5. The method of claim 2, further comprising balancing the first and second pressures with the cover plate such that the cover plate continues sealing the opening during presence of the first and second pressures.

6. The method of claim 1, further comprising casting and demoulding the demolded concrete product prior to positioning the demolded concrete product, and wherein the steps of positioning the demolded concrete product and introducing the $CO_2$ gas are executed after and proximate in time to the step of demoulding.

7. The method of claim 1, wherein the steps of positioning the demolded concrete product and introducing the $CO_2$ are executed immediately after the step of demoulding.

8. The method of claim 1, further comprising executing at least one of setting, hydration, and pre-conditioning steps with respect to the demolded concrete product prior to the step of introducing the $CO_2$.

9. The method of claim 1, further comprising hydrating the demolded concrete product after completion of the step of introducing the $CO_2$ gas.

10. The method of claim 1, further comprising pressurizing the cavity to a pre-determined pressure of the $CO_2$ gas.

11. The method of claim 10, further comprising varying the pre-determined pressure of the $CO_2$ gas.

12. The method of claim 1, further comprising sealing the opening such that at least some of the $CO_2$ gas is allowed to escape from the cavity during the carbonation of the demolded concrete product.

13. The method of claim 6, wherein the casting is executed using one or a combination of zero-slump concrete, wet concrete, self-compacting concrete, Portland cement, and slag.

14. The method of claim 6, wherein the casting is executed as one of dry casting and wet casting.

15. The method of claim 1, wherein introducing the $CO_2$ gas is executed by introducing a gas containing $CO_2$ at a concentration of between 5% and 99.5% $CO_2$ by mass.

16. A method of curing a concrete product, the method comprising:
   obtaining a concrete product defining a cavity and an opening leading into the cavity, the cavity peripherally bounded by an inner surface of the demolded concrete product, the concrete product being a demolded concrete product, wherein the inner surface of the demoulded concrete product is exposed to the cavity and an outer surface of the demoulded concrete product is exposed to an environment outside the demoulded concrete product;
   sealing the cavity;
   executing carbonation of the demolded concrete product by introducing carbon dioxide ($CO_2$) gas into the sealed cavity, including exposing the inner surface of the demolded concrete product to the $CO_2$ gas; and
   in response to the demolded concrete product attaining a target specification, unsealing the cavity.

17. The method of claim 16, further comprising disposing at least one container into the cavity prior to sealing the cavity, the at least one container containing the $CO_2$ gas pressurized therein, and wherein introducing the $CO_2$ gas into the cavity includes releasing the $CO_2$ gas into the cavity from the at least one container.

18. The method of claim 16, wherein introducing the $CO_2$ gas into the cavity includes pressurizing the cavity to a first pressure for a first period of time, followed by increasing the pressure in the cavity to a second pressure for a second period of time.

19. The method of claim 17, wherein the at least one container includes at least one of a tire tube and a tire, and introducing the $CO_2$ gas into the cavity includes operating at least one valve fluidly connected to the at least one of the tire tube and the tire.

20. The method of claim 16, wherein sealing the cavity further comprises using a cover plate that is one or more of: weighted to balance a pressure of the $CO_2$ gas, hinged to a member disposed proximate the demolded concrete product, and guided relative to the member.

* * * * *